United States Patent
Torikawa et al.

(10) Patent No.: US 9,821,853 B2
(45) Date of Patent: Nov. 21, 2017

(54) VEHICLE FRONT PART STRUCTURE

(71) Applicants: TOYOTA JIDOSHA KYUSHU KABUSHIKI KAISHA, Miyawaka-shi, Fukuoka-ken (JP); TOYOTA JIDOSHA KABUSHIKI KAISHA, Toyota-shi, Aichi-ken (JP)

(72) Inventors: Yasushi Torikawa, Miyoshi (JP); Shigeru Kaji, Tagawa (JP); Kenji Chiba, Tokai (JP)

(73) Assignees: TOYOTA JIDOSHA KYUSHU KABUSHIKI KAISHA, Toyota (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 143 days.

(21) Appl. No.: 14/797,906

(22) Filed: Jul. 13, 2015

(65) Prior Publication Data
US 2016/0016612 A1    Jan. 21, 2016

(30) Foreign Application Priority Data
Jul. 18, 2014    (JP) ................................. 2014-147585

(51) Int. Cl.
  *B62D 25/04*    (2006.01)
  *B62D 25/02*    (2006.01)
  *B62D 25/14*    (2006.01)

(52) U.S. Cl.
  CPC ........... *B62D 25/025* (2013.01); *B62D 25/04* (2013.01); *B62D 25/14* (2013.01)

(58) Field of Classification Search
  CPC ...... B62D 25/025; B62D 25/04; B62D 25/14; B62D 21/155; B60R 2019/007

USPC ............................ 296/187.12, 187.1, 203.03
See application file for complete search history.

(56) References Cited

U.S. PATENT DOCUMENTS

| | | | | |
|---|---|---|---|---|
| 5,275,436 A | * | 1/1994 | Pomero | B60R 21/00 180/232 |
| 6,631,942 B1 | * | 10/2003 | Kitagawa | B62D 21/152 296/187.1 |
| 7,163,259 B2 | * | 1/2007 | Hayashi | B62D 24/02 296/187.09 |

(Continued)

FOREIGN PATENT DOCUMENTS

| | | |
|---|---|---|
| JP | 2001-287670 A | 10/2001 |
| JP | 2002-154458 A | 5/2002 |

(Continued)

*Primary Examiner* — H Gutman
(74) *Attorney, Agent, or Firm* — Oliff PLC

(57) ABSTRACT

In a vehicle front part structure of a vehicle body, a gusset member is disposed in front of a front pillar. The gusset member is positioned so as to overlap with at least a front tire in the vertical direction of the vehicle body. The gusset member covers at least a portion of a lower portion of the front pillar on a front side in the longitudinal direction of the vehicle body. The gusset member has a stepped portion on a front side thereof in the longitudinal direction of the vehicle body. The stepped portion extends in the vertical direction of the vehicle body and makes a portion of the gusset member disposed inside in the vehicle width direction positioned relatively in front of a portion of the gusset member disposed outside in the vehicle width direction in the longitudinal direction of the vehicle body.

4 Claims, 16 Drawing Sheets

(56) References Cited

U.S. PATENT DOCUMENTS

| | | | |
|---|---|---|---|
| 8,029,050 B2* | 10/2011 | Tamakoshi | B62D 21/152 |
| | | | 296/193.06 |
| 8,469,442 B1 | 6/2013 | Pencak et al. | |
| 8,939,496 B2* | 1/2015 | Obayashi | B62D 21/152 |
| | | | 296/187.08 |
| 9,126,629 B2* | 9/2015 | Gilbert | B62D 21/00 |
| 9,187,133 B2* | 11/2015 | Rangaswamaiah | B62D 25/04 |
| 9,272,736 B1* | 3/2016 | Clauser | B62D 25/14 |
| 9,365,245 B2* | 6/2016 | Donabedian | |
| 9,428,223 B2* | 8/2016 | Gilbert | B62D 24/00 |
| 9,469,347 B1* | 10/2016 | Schnug | B62D 21/15 |
| 9,487,236 B2* | 11/2016 | Ozawa | B62D 21/152 |
| 9,533,712 B2* | 1/2017 | Panganiban | B62D 25/16 |
| 9,688,311 B2* | 6/2017 | Yamamoto | B62D 25/025 |
| 2002/0063445 A1 | 5/2002 | Takeuchi | |
| 2011/0156446 A1* | 6/2011 | Iwase | B62D 25/025 |
| | | | 296/193.06 |
| 2012/0043785 A1* | 2/2012 | Mildner | B62D 25/2045 |
| | | | 296/193.02 |
| 2012/0153679 A1* | 6/2012 | Yasuhara | B62D 21/152 |
| | | | 296/203.02 |
| 2013/0285414 A1* | 10/2013 | Alavandi | B62D 25/04 |
| | | | 296/193.06 |
| 2014/0091593 A1* | 4/2014 | Obayashi | B62D 21/152 |
| | | | 296/187.1 |
| 2014/0232136 A1* | 8/2014 | Gilbert | B62D 24/00 |
| | | | 296/187.09 |
| 2015/0008703 A1* | 1/2015 | Furusaki | B62D 21/152 |
| | | | 296/187.08 |
| 2015/0166112 A1* | 6/2015 | Chung | B62D 25/08 |
| | | | 296/187.1 |
| 2015/0298744 A1* | 10/2015 | Winberg | B62D 27/023 |
| | | | 296/187.09 |
| 2016/0039466 A1* | 2/2016 | Yamamoto | B62D 25/04 |
| | | | 296/193.06 |
| 2016/0052554 A1* | 2/2016 | Ozawa | B62D 21/152 |
| | | | 296/187.09 |

FOREIGN PATENT DOCUMENTS

| | | |
|---|---|---|
| JP | 2010-047178 A | 3/2010 |
| JP | 2015-116979 A | 6/2015 |

* cited by examiner

VEHICLE FRONT PART STRUCTURE

BACKGROUND OF THE INVENTION

Field of the Invention

The present invention relates to a vehicle front part structure of a vehicle such as an automobile, and more particularly to a structure of a lower portion of a vehicle body positioned behind a front tire in the longitudinal direction of the vehicle body in a vehicle.

Description of the Related Art

As the vehicle front part structure of an automobile, there has been known the structure which includes: lockers arranged substantially horizontally with the longitudinal direction of the vehicle body set as the longitudinal direction of the lockers; and front pillars (A pillars) extending toward an upper side of the vehicle body from end portions of the locker on a front side in the longitudinal direction of the vehicle body on both outer sides of a lower portion of the vehicle body of the vehicle in the vehicle width direction. In such a structure, the front pillar extends in the vertical direction between a front glass and an opening portion of a front door, and the locker extends toward a rear side of the vehicle body from a lower end portion of the front pillar. Both the locker and the front pillar are formed of a hollow frame portion having a closed cross-sectional shape in transverse cross section. The locker and the front pillar are integrally formed with each other and constitute portions of the frame structure of the vehicle body.

In such vehicle front part structure, the lockers and the front pillars are formed in approximately left and right symmetry in the vehicle, and a dash panel is disposed between the left and right lockers and front pillars. The dash panel is a plate-like member having a relatively small thickness (thin plate portion) by which an engine room in which an engine and the like provided in an automobile are housed and a cabin (vehicle indoor space) where a driver's seat and the like are disposed are separated from each other. Front tires are arranged in front of left and right lockers in the longitudinal direction of the vehicle body.

The vehicle front part structure has, from a viewpoint of ensuring safety of an occupant of an automobile, the constitution which can disperse or absorb an impact generated by collision and can increase the strength of members in preparation for the collision involving a front portion of a vehicle. As to the kinds of collisions involving a front portion of an automobile, various kinds of collisions such as a full-lap collision where the whole front surface of a vehicle body in a width direction collides with something, an offset (overlap) collision where a portion such as an approximately half of the front surface of the vehicle body in a width direction collides with something, and an oblique (skew) collision are named. For ensuring safety, collision tests are performed with respect to respective kinds of collisions. Particularly, recently, in an offset collision, the evaluation on a fine lap collision which is a collision where an overlapping portion is relatively small (¼ of a vehicle width in tests) has become important as an index of safety. When an automobile is involved in a fine overlap collision, for example, due to the relationship where the movement of front tires on a side where the collision occurs is restricted by the connecting structure with respect to a vehicle body side or the like, the front tire moves backward while being steered (going along an inner track) toward the inside of the vehicle by following a trajectory which draws an arc passing in front of a locker.

As a technique provided for coping with the collision involving a front portion of a vehicle, there has been proposed the vehicle front part structure where a plate is provided on a front portion of a locker for preventing the movement and the deformation of the front tire which moves backward at the time of collision in the front portion of the locker (see JP-A-2001-287670 (patent literature 1), for example). Patent literature 1 discloses the constitution where, for suppressing the deformation of a front tire toward an area below a locker at the time of an offset collision, a plate mounted on a front portion of the locker is provided at a position in front of a connecting portion between the locker and the front pillar and behind the front tire.

SUMMARY OF THE INVENTION

When a front portion of a vehicle collides with something at the time of an offset collision or the like, the front tire which moves backward while going along an inner track by following a trajectory which draws an arc as described previously moves toward a dash panel between left and right lockers and front pillars and, depending on the behavior of the front tire, the front tire gives an impact to the dash panel so that a deformation amount of the dash panel is increased thus becoming one of factors which reduce a space of a cabin. Accordingly, giving an impact to the dash panel by the front tire is a state to be avoided from a viewpoint of ensuring safety of an occupant.

In this respect, it is considered that the constitution described in patent literature 1 can suppress the deformation of a front tire toward an area below the locker at the time of an offset collision. However, with respect to the behavior of the front tire which moves backward while going along an inner track by following a trajectory which draws an arc, it is not possible to prevent the front tire from giving an impact to the dash panel. In this manner, the prior art disclosed in patent literature 1 or the like has a drawback that it is impossible to prevent direct inputting of an impact of the front tire which moves backward while going along an inner track when a front portion of a vehicle collides with the dash panel at the time of an offset collision.

Further, as measures to reduce a damage on the dash panel caused by an impact given to the dash panel by the front tire, the increase of a strength of a member of the dash panel per se or the increase of a strength for connecting the dash panel to the locker, the front pillar and the like are considered. These measures, however, bring about a large change in basic frame of the vehicle and hence, it is necessary to exchange parts per se with new parts or it is necessary to perform molding as an additional step whereby the introduction of these measures is difficult and is not suitable from a viewpoint of cost.

The present invention has been made in view of the above-mentioned circumstances, and it is an object of the present invention to provide a vehicle front part structure which can, without bringing about a large change in a basic frame of a vehicle, prevent a front tire which moves backward while going along an inner track when a front portion of the vehicle collides such as at the time of an offset collision or the like from giving an impact to a thin plate portion such as a dash panel thus enhancing safety.

According to the one aspect of the present invention, there is provided a vehicle front part structure which includes: a locker arranged on both outer sides of a lower portion of a vehicle body of a vehicle in a vehicle width direction with a longitudinal direction of the vehicle body set as a longitudinal direction of the locker; a front pillar formed on an end portion of the locker on a front side of the vehicle body and extending toward an upper side of the vehicle body from the end portion of the locker; a front tire disposed in front of the locker in the longitudinal direction of the vehicle body; and a gusset member disposed in front of the front pillar in the longitudinal direction of the vehicle body in a state where the gusset member is fixed to a frame structure of the vehicle body including the locker and the front pillar, the gusset member being positioned so as to overlap with at least the front tire in the vertical direction of the vehicle body, gusset member covering at least a portion of a lower portion of the front pillar on a front side in the longitudinal direction of the vehicle body, wherein the gusset member has a stepped portion on a front side thereof in the longitudinal direction of the vehicle body, the stepped portion extends in the vertical direction of the vehicle body and makes a portion of the gusset member disposed inside in the vehicle width direction positioned relatively in front of a portion of the gusset member disposed outside in the vehicle width direction in the longitudinal direction of the vehicle body.

In the vehicle front part structure according to one aspect of the present invention, the gusset member further includes an extension portion extending toward the inside in the vehicle width direction, the extension portion is positioned in front of a thin wall portion in the longitudinal direction of the vehicle body, wherein the thin wall portion is positioned in front of a cabin of the vehicle in the longitudinal direction of the vehicle body, and the extension portion covers at least a portion of the thin plate portion from a front side in the longitudinal direction of the vehicle body.

In the vehicle front part structure according to one aspect of the present invention, the gusset member is formed of a hollow body having an approximately closed cross-sectional shape or an closed cross-sectional shape by a wall surface structure which has a longitudinal direction thereof in the longitudinal direction of the vehicle body, and includes a wall portion on a rear side in the longitudinal direction of the vehicle body and a wall portion on a front side in the longitudinal direction of the vehicle body in a transverse cross-sectional shape thereof, and the gusset portion further comprises a bulk shaped portion which is formed in the inside of the hollow body and has a ridge which partially narrows a distance in the longitudinal direction of the vehicle body between a wall portion of the gusset portion on a rear side in the longitudinal direction of the vehicle body and a wall portion of the gusset portion on a front side in the longitudinal direction of the vehicle body.

According to the present invention, it is possible to prevent a front tire which moves backward while going along an inner track at the time of collision involving a front part of a vehicle such as at the time of an offset collision from giving an impact to a thin plate portion such as a dash panel so that safety can be enhanced without largely changing a basic frame of the vehicle.

DESCRIPTION OF PREFERRED EMBODIMENTS

The present invention is directed to a vehicle front part structure which includes lockers and front pillars which are integrally formed with each other on both outer sides of a front portion of a vehicle in the vehicle width direction and form parts of the frame structure of a vehicle body. To be more specific, the present invention provides the vehicle front part structure which can enhance safety by avoiding the occurrence of a phenomenon where a front tire moves along an inner track at the time of vehicle front part collision such as an offset collision, gives an impact to a thin plate portion such as a dash panel and largely increases a deformation amount of the thin plate portion. To this end, gusset members are disposed in front of the front pillars in a longitudinal direction of the vehicle body, and the shape of the gusset member is contrived. Hereinafter, embodiments of the present invention are explained by reference to drawings.

For the sake of convenience of explanation, in respective drawings, assume the direction indicated by an arrow UP as the vehicle body upward direction of the vehicle, the direction indicated by an arrow FR as the vehicle body frontward direction of the vehicle, and the direction indicated by an arrow OUT as the vehicle body leftward direction of the vehicle (left outward direction of the vehicle width direction (lateral direction of vehicle body)) when appropriate. Further, in the explanation made hereinafter, assume that, in principle, "front and rear" means "front and rear" in the longitudinal direction of the vehicle body, "up and down" means "up and down" in the vertical direction of the vehicle body, and "left and right" means "left and right" in the lateral direction of the vehicle body. The descriptions "the longitudinal direction of the vehicle body", "the vertical direction of the vehicle body" and "the lateral direction of the vehicle body" include the directions which are slightly deviated from the directions which the respective descriptions indicate in the strict meaning of the terms, that is, the approximately longitudinal direction of the vehicle body, the approximately vertical direction of the vehicle body and the approximately lateral direction of the vehicle body. Further, in the respective drawings, although a left side of the vehicle body is described, the vehicle front part structure explained hereinafter is also applicable to a right side of the vehicle body in the same manner.

First Embodiment

Figure 1:
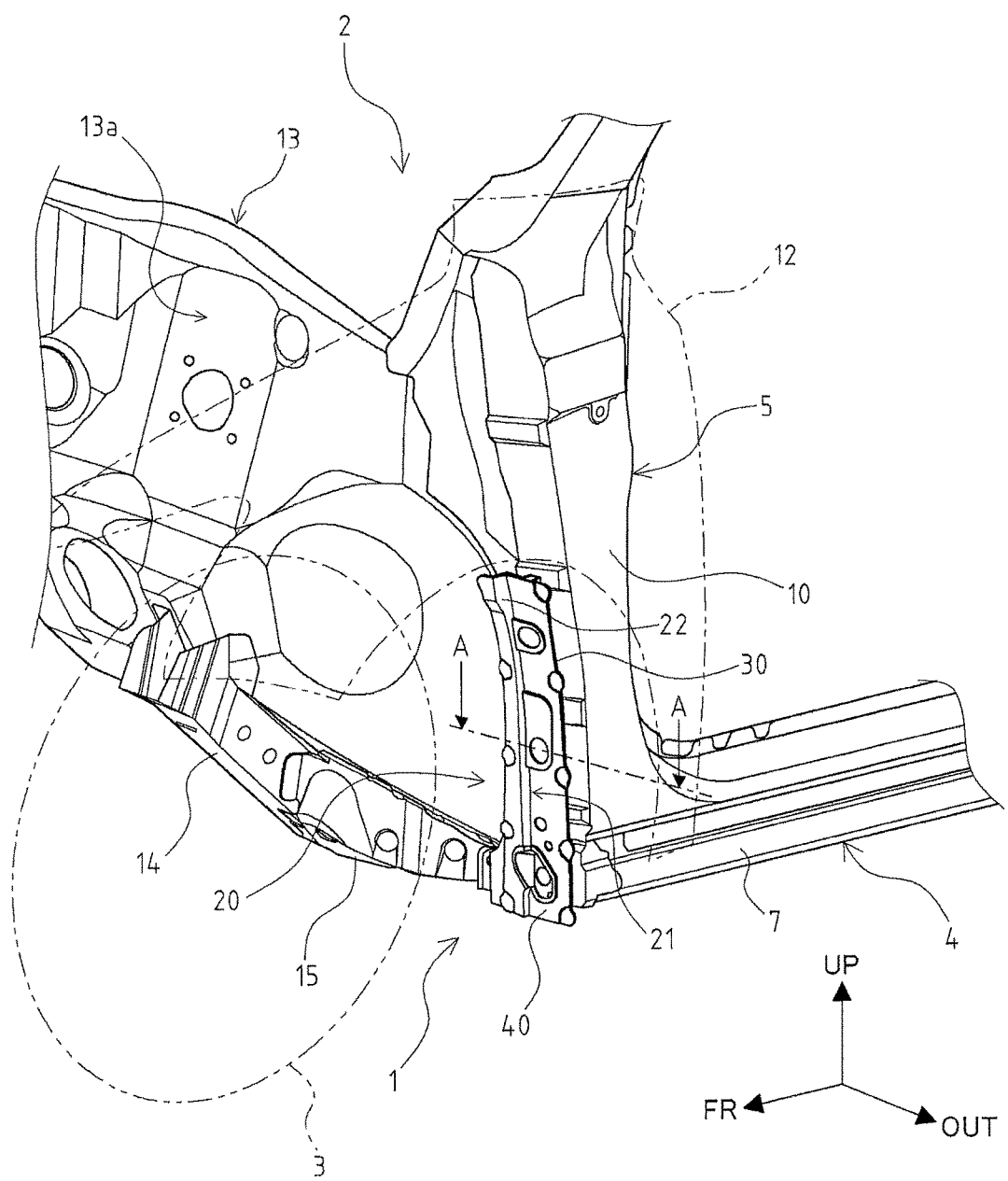
FIG. 1 is a perspective view showing the vehicle front part structure according to a first embodiment of the present invention.
Figure 2:
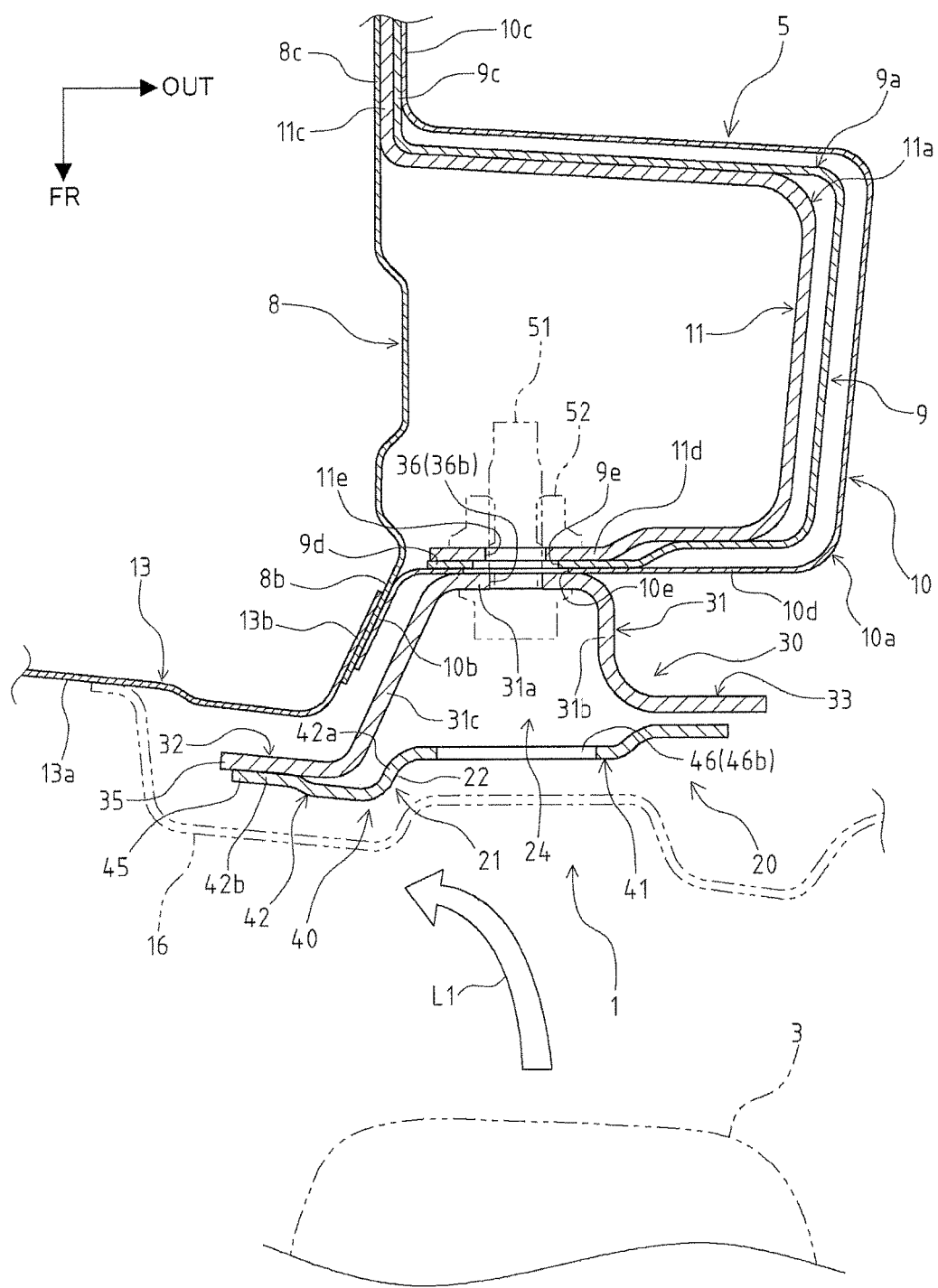
FIG. 2 is a horizontal cross-sectional view showing the vehicle front part structure of the first embodiment of the present invention.

The first embodiment of the present invention is explained. As shown in FIG. 1 and FIG. 2, a vehicle front part structure 1 according to this embodiment is a structure of a lower part of a vehicle body positioned behind a front tire 3 of a vehicle 2 which is an automobile in the longitudinal direction of the vehicle body. FIG. 2 is a horizontal cross-sectional view showing the front structure of the vehicle 2, and corresponds to a cross-sectional view taken along a line A-A in FIG. 1 (corresponding to a line A'-A' in FIG. 4).

The vehicle front part structure 1 includes a pair of left and right lockers 4 and a pair of left and right front pillars 5 in the vehicle 2. Both of the lockers 4 and the front pillars 5 are formed of a metal made member respectively.

The lockers 4 are arranged on both outer sides of a lower portion of the vehicle body of the vehicle 2 in the vehicle width direction with the longitudinal direction of the vehicle body set as the longitudinal direction of the lockers 4. The locker 4 includes: a locker inner panel constituting an inner side portion of the locker 4 in the vehicle width direction (not shown in the drawing); and a locker outer panel 7 constituting an outer side portion of the locker 4 in the vehicle width direction.

The locker inner panel is configured such that a transverse cross-sectional (vertical cross-sectional) shape of the locker inner panel taken along a plane perpendicular to the extending direction of the locker 4 is formed into an approximately hat shape, and an opening side of the transverse cross-sectional shape faces the outside in the vehicle width direction. Although not shown in the drawing, the locker outer panel 7 is configured such that a transverse cross-sectional shape of the locker outer panel 7 taken along a plane perpendicular to the extending direction of the locker 4 is formed into an approximately hat shape, and an opening side of the transverse cross-sectional shape faces the inside in the vehicle width direction.

With respect to the locker inner panel and the locker outer panel 7 which are provided in a state where the opening side of the locker inner panel and the opening side of the locker outer panel 7 face each other in a transverse cross-sectional shape, flange portions of the locker inner panel and the locker outer panel 7 corresponding to brim portions of an approximately hat shape which is a transverse cross-sectional shape are fixed to each other by spot welding or the like thus forming a hollow frame portion having a closed cross-sectional shape in transverse cross section. A locker reinforcement which is a member constituting the locker 4 and also constituting a reinforcing member having a suitable closed cross-sectional structure is disposed in the inside of the hollow locker 4 in an extending manner along the longitudinal direction of the vehicle body.

The front pillar 5 extends toward an upper side of the vehicle body from an end portion of the locker 4 on a vehicle body front side. That is, the front pillar 5 extends in the vertical direction between an opening portion of a front-side door and a front glass of the vehicle 2, and the locker 4 extends toward a rear side of the vehicle body from a lower end portion of the front pillar 5. An approximately "L" shaped inner side defined by the front pillar 5 and the locker 4 forms an opening portion of the door. The front pillar 5 includes; a front pillar inner panel 8 constituting an inner-side portion of the front pillar 5 in the vehicle width direction; a front pillar outer panel 9 constituting an outer-side portion of the front pillar 5 in the vehicle width direction; and a side member outer panel 10 disposed so as to cover the front pillar outer panel 9 from the outside.

As shown in FIG. 2, front pillar inner panel 8 has a portion formed into an approximately straight-line shape as a whole while having a predetermined uneven shape in transverse cross section (horizontal cross sectional) taken along a plane perpendicular to the extending direction of the front pillar 5, and the extending direction of the transverse cross-sectional shape conforms to the longitudinal direction of the vehicle body. The front pillar outer panel 9 is configured such that a transverse cross-sectional shape of the front pillar outer panel 9 taken along a plane perpendicular to the extending direction of the front pillar 5 is formed into an approximately "horizontally laid U" shape or an approximately "U" shape, and an opening side of the transverse cross-sectional shape faces the inside in the vehicle width direction. The side member outer panel 10 is configured such that a transverse cross-sectional shape of the side member outer panel 10 taken along a plane perpendicular to the extending direction of the front pillar 5 is formed into an approximately hat shape, and an opening side of the transverse cross-sectional shape faces the inside in the vehicle width direction, that is, a projecting side of the transverse cross-sectional shape faces the outside in the vehicle width direction.

The front pillar outer panel 9 is provided inside the side member outer panel 10 such that the front pillar outer panel 9 conforms to a projecting shape of the side member outer panel 10 in a transverse cross-sectional shape. The front pillar inner panel 8, the front pillar outer panel 9 and the side member outer panel 10 are provided such that the front pillar inner panel 8 closes an opening side of the front pillar outer panel 9 and an opening side of the side member outer panel 10 in a transverse cross-sectional shape.

In the front pillar inner panel 8, front and rear end portions of an approximately straight-line portion extending in the longitudinal direction of the vehicle body and closing an opening side of the side member outer panel 10 in a transverse cross-sectional shape are formed as joining edge portions 8b, 8c. The front pillar outer panel 9 includes a body portion 9a having a "horizontally laid U" shape or a "U" shape in a transverse cross-sectional shape such that an inner side in the vehicle width direction forms an opening side. A portion of the body portion 9a which extends from an edge portion of the body portion 9a in the longitudinal direction of the vehicle body is formed as a flange portion 9c. The side member outer panel 10 includes a body portion 10a having a "horizontally laid U" shape or a "U" shape in a transverse cross-sectional shape such that an inner side in the vehicle width direction forms an opening side. Portions of the body portion 10a which extend from both edge portions of the body portion 10a in the longitudinal direction of the vehicle body and correspond to a brim portion of an approximately hat shape are formed as front and rear flange portions 10b, 10c.

The joining edge portion 8c of the front pillar inner panel 8 on a vehicle body rear side, and the flange portions 9c, 10c of the front pillar outer panel 9 and the side member outer panel 10 on a vehicle body rear side are fixed to each other by spot welding or the like in a state where these portions overlap with each other. Further, the joining edge portion 8b of the front pillar inner panel 8 on the vehicle body front side and the flange portion 10b of the side member outer panel 10 on a vehicle body front side are fixed to each other by spot welding or the like in a state where these portions overlap with each other. A hollow frame portion having a closed cross-sectional shape in transverse cross section is formed in this manner.

In the inside of the hollow front pillar 5, a front pillar reinforcement 11 which is a member for reinforcing the front pillar 5 is disposed. As shown in FIG. 2, the front pillar reinforcement 11 is disposed inside the front pillar outer panel 9 such that the front pillar reinforcement 11 conforms to a projecting shape of the front pillar outer panel 9 in a transverse cross-sectional shape.

That is, the front pillar reinforcement 11 is configured such that a transverse cross-sectional shape of the front pillar reinforcement 11 taken along a plane perpendicular to the extending direction of the front pillar 5 is formed into an approximately "horizontally laid U" shape or an approximately "U" shape, and an opening side of the transverse cross-sectional shape faces the inside in the vehicle width direction. The front pillar reinforcement 11 includes a body portion 11a having a "horizontally laid U" shape or a "U" shape in a transverse cross-sectional shape. A portion of the body portion 11a which extends in the longitudinal direction of the vehicle body from an edge portion of the body portion 11a is formed as a flange portion 11c. The front pillar reinforcement 11 is joined together with the front pillar inner panel 8, the front pillar outer panel 9 and the side member outer panel 10 in the joined portion of the joining edge portion 8c and the flange portions 9c, 10c as described above in a state where the flange portion 11c is interposed between the joining edge portion 8c and the flange portion 9c.

As described above, the locker 4 and the front pillar 5 each of which is constituted of a plurality of members are integrally formed with each other thus constituting a part of the frame structure of the vehicle body of the vehicle 2 (hereinafter referred to as "vehicle body frame structure"). That is, the plurality of members which constitute the locker 4 and the front pillar 5 respectively as described above form vehicle body frame members of the vehicle 2.

The vehicle body which forms the greater part of the vehicle 2 is mainly constituted of the metal-made vehicle body frames such as the lockers 4 and the front pillars 5 which form the vehicle body frame structure, metal-made vehicle body panels such as a hood constituting an external cover portion provided outside the vehicle body frame structure, exterior parts such as resin-made or metal-made bumpers and the like. For example, on both outer sides of the vehicle front structure 1 in the vehicle width direction, a front fender panel 12 is provided as a metal-made vehicle body panel constituting an external cover portion of the vehicle body (see FIG. 1).

A dash panel 13 is provided between the left and right lockers 4 and front pillars 5 formed in approximately left and right symmetry and in front of the lockers 4 in the longitudinal direction of the vehicle body in the vehicle 2. The dash panel 13 is a plate-shaped member having a relatively small thickness which defines an engine room in which an engine and the like provided to the vehicle 2 are housed and a cabin (vehicle inner space) which is positioned behind the engine room in the longitudinal direction of the vehicle body and in which a driver's seat and the like are disposed. In the vehicle front structure 1 of this embodiment, the dash panel 13 corresponds to a thin plate portion which is disposed between the lockers 4 and the front pillars 5 on both sides in the vehicle width direction, and is positioned in front of the cabin of the vehicle 2. The dash panel 13 has a plate thickness of approximately 1mn, for example.

The dash panel 13 includes a dash panel body portion 13a having an approximately flat plate shape and extending in the vehicle width direction, and side flange portions 13b formed on outer end portions of the dash panel body portion 13a in the vehicle width direction (both end portions). The side flange portions 13b are integrally formed with the dash panel body portion 13a such that the side flange portions 13b are bent toward a rear side in the longitudinal direction of the vehicle body with respect to the dash panel body portion 13a.

The dash panel 13 is fixed to the front pillars 5 such that portions of the side flange portions 13b are joined to a joined portion between the joining edge portions 8b of the front pillar inner panels 8 of a front pillars 5 on a vehicle body front side and the flange portion 10b of the side member outer panels 10 in an overlapping manner by spot welding or the like from the inside in the vehicle width direction. That is, to the joined portion of the side flange portions 13b of the dash panel 13, in the order from the inside in the vehicle width direction, the side flange portion 13b of the dash panel 13, the joining edge portions 8b of the front pillar inner panels 8 and the flange portions 10b of the side member outer panels 10 overlap with each other, and these three plate-like portions are fixed by the spot welding or the like (see FIG. 2).

The vehicle 2 also includes front side members 14 and torque boxes 15 as members which constitute the vehicle body frame structure.

The pair of left and right front side members 14 are provided to the vehicle 2 such that the longitudinal direction of the front side members 14 is made to conform to the longitudinal direction of the vehicle body and the front side members 14 are arranged parallel to each other in the vehicle width direction. The front side members 14 are positioned below the dash panel 13 in the vehicle body frame structure, and are provided such that the front side members 14 follow an inclined surface shaped portion which is gradually upwardly inclined toward a vehicle body front side of the dash panel 13 from a vehicle body rear side. The front side member 14 is formed such that a transverse cross-sectional shape of the front side member 14 taken along a plane perpendicular to the extending direction thereof is formed into an approximately hat shape, has an opening side of a transverse cross-sectional shape directed toward an upper side of the vehicle body, and forms the closed cross-sectional structure together with a portion of the dash panel 13.

The torque box 15 is disposed outside the front side member 14 in the vehicle width direction, and connects the front side member 14 and the locker 4 to each other on a cabin outer side of the dash panel 13. The torque box 15 is a member which forms a closed space together with other members constituting the vehicle body frame structure, and forms a recessed shape as a whole by a plurality of plate-shaped portions. A side wall portion of the torque box 15 is fixed to a wall surface of the front side member 14 on a vehicle-width-direction outer side, and a lower portion of the torque box 15 is fixed to a floor panel (not shown in the drawing) constituting the vehicle body frame structure. In the inside of the torque box 15, a torque box reinforcement 18 which is a reinforcing member having a suitable closed cross-sectional structure is disposed together with members which constitute the torque box 15 (see FIG. 7).

Figure 6:
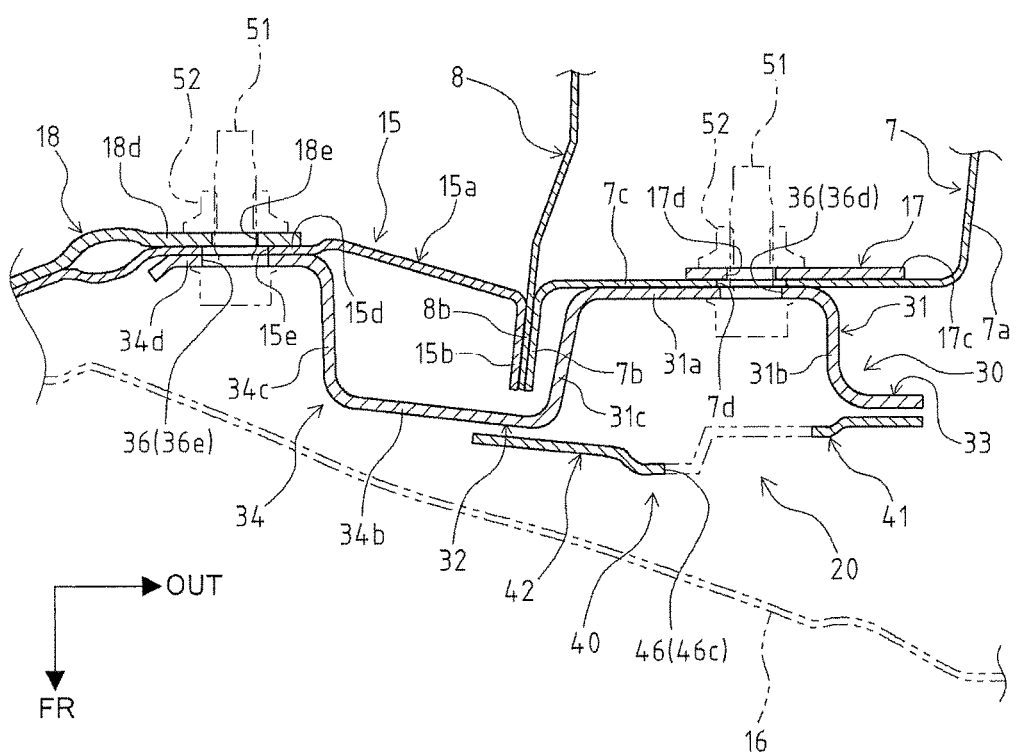
FIG. 6 is a horizontal cross-sectional view showing the vehicle front part structure according to the first embodiment of the present invention.

Further, an outer portion of the torque box 15 in the vehicle width direction is fixed to constitutional members of the locker 4 and the front pillar 5. The specific constitution of the portion is as follows. As shown in FIG. 6, the torque box 15 has a side flange portion 15b formed in a bent manner toward a vehicle body front side with respect to the torque box body portion 15a at end portions thereof facing the outer sides in the vehicle width direction (both end portions of the torque box 15). On the other hand, as described above, the front pillar inner panel 8 which constitutes the front pillar 5 includes the joining edge portion 8b at an end portion thereof on a vehicle body front side. The side flange portion 15b of the torque box 15 and the joining edge portion 8b of the front pillar inner panel 8 are fixed to each other by spot welding or the like in a mutually overlapping state. FIG. 6 is a horizontal cross sectional view showing the front part structure of the vehicle 2, and corresponds to a cross-sectional view taken along a line B-B in FIG. 4 in relation to a gusset member 20 (gusset rear panel 30).

Further, as shown in FIG. 6, the locker outer panel 7 which constitutes the locker 4 includes: a front wall portion 7c which is formed on a front end portion of the locker outer panel 7 in the longitudinal direction of the vehicle body such that the front wall portion 7c is bent toward the inside in the vehicle width direction with respect to a side wall portion 7a disposed outside in the vehicle width direction; and a front flange portion 7b which is formed such that the front flange portion 7b is bent toward a front side in the longitudinal direction of the vehicle body with respect to the front wall portion 7c. The front flange portion 7b overlaps with a joint portion between the side flange portion 15b and the joining edge portion 8b from a joining edge portion 8b side which is an outer side in the vehicle width direction, and is fixed to the joint portion by spot welding or the like. That is, the side flange portion 15b of the torque box 15, the joining edge portion 8b of the front pillar inner panel 8 and the front flange portion 7b of the locker outer panel 7 are made to overlap with the joint portion of the torque box 15 to the locker 4 in order from the inside in the vehicle width direction, and these three plate-like portions are fixed to the joint portion by spot welding or the like. In this manner, portions of the torque box 15 facing the outer side in the vehicle width direction are fixed to the locker 4 in this manner.

Figure 7:
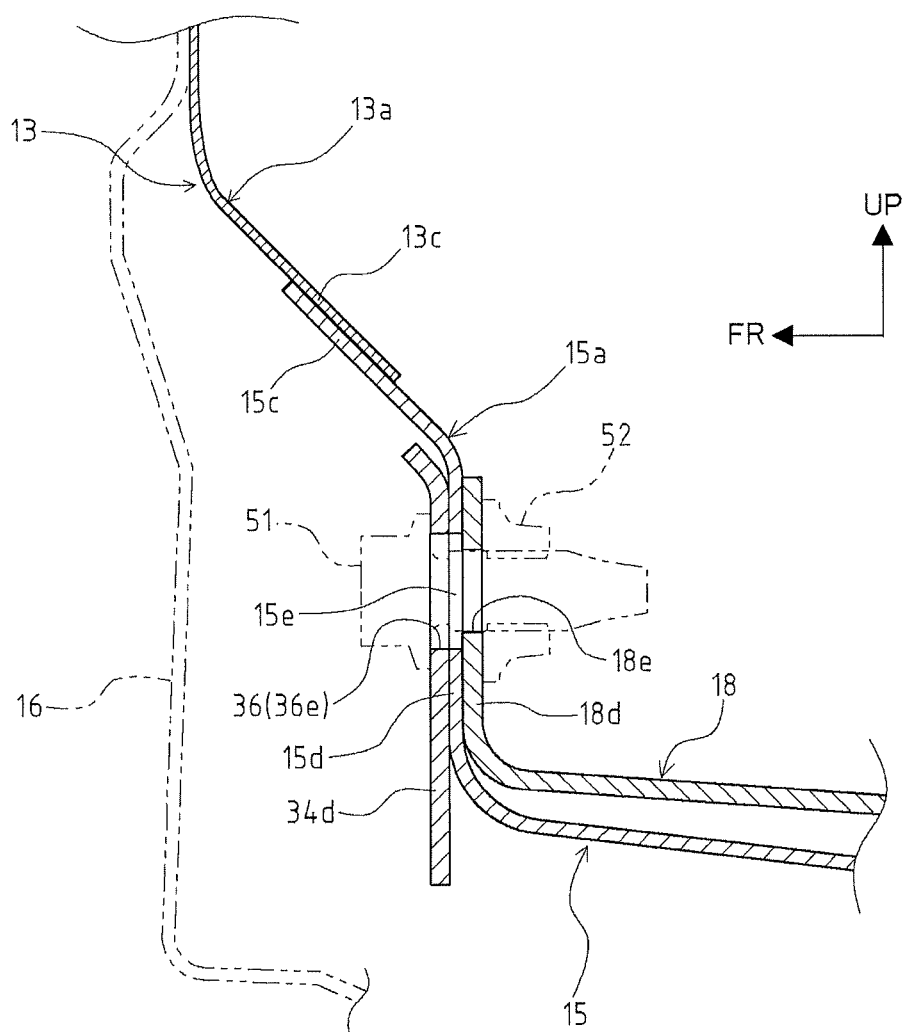
FIG. 7 is a vertical cross-sectional view showing the vehicle front part structure according to the first embodiment of the present invention.

A portion of the torque box 15 facing the upper side in the vertical direction of the vehicle body is fixed to the dash panel 13. To be more specific, as shown in FIG. 7, the torque box 15 has an inclined surface portion 15c which is gradually inclined upward from a rear side in the longitudinal direction of the vehicle body to a front side in the longitudinal direction of the vehicle body on a portion thereof disposed at an upper side of the vehicle. The inclined surface portion 15c is formed so as to follow the inclination of an inclined surface portion 13c which the dash panel 13 has at an end portion of a dash panel body portion 13a on a lower side in the vertical direction of the vehicle body. The torque box 15 is fixed to the dash panel 13 such that a portion of the inclined surface portion 15c of the torque box 15 is made to overlap with the inclined surface portion 13c of the dash panel 13 from a lower side in the vertical direction of the vehicle body (from a front side in the longitudinal direction of the vehicle body) and is joined to the inclined surface portion 13c by spot welding or the like. FIG. 7 is a vertical cross-sectional view showing the front part structure of the vehicle 2. FIG. 7 corresponds to a cross-sectional view taken along a line C-C in FIG. 4 in relation to the gusset member 20 (gusset rear panel 30).

In the front part structure of the vehicle 2 having the above-mentioned constitution, wheel housings are formed in front of both left and right lockers 4 in the longitudinal direction of the vehicle body, and the front tires 3 are arranged in the inside of the wheel housings respectively. The wheel housing in which the front tire 3 is arranged is generally constituted of a fender liner 16 formed of a semicircular thin plate member made of a synthetic resin material and the like.

With respect to the front part structure of the vehicle 2 having the above-mentioned constitution, when the automobile 2 causes an offset collision, particularly, a fine lap collision due to the relationship that the movement of the front tire 3 on a side where the collision occurs is restricted by the connecting structure with respect to a vehicle body side or the like, the front tire 3 moves backward while being steered (going along an inner track) toward the inside of the vehicle by following a trajectory which draws an arc passing in front of the locker 4 (see an arrow L1 in FIG. 2). The front tire 3 which moves backward while going along an inner track in this manner extends toward the dash panel 13 disposed between the locker 4 and the front pillar 5 on a left side and the locker 4 and the front pillar 5 on a right side and hence, depending on the behavior of the front tire 3, the front tire 3 traces a trajectory along which the front tire 3 gives an impact to the dash panel 13. In this case, there is a possibility that a deformation amount of the dash panel 13 is increased thus giving rise to a possibility that a space in the cabin is decreased.

In view of the above, to cope with such moving back of the front tire 3 at the time of collision involving the vehicle front part such as an offset collision involving the vehicle 2, the vehicle front part structure 1 of this embodiment includes the gusset member 20 disposed in front of the front pillar 5 in the longitudinal direction of the vehicle body. The gusset member 20 is a reinforcing member which is disposed so as to cover the approximately whole lower portion of the front side of the front pillar 5 in the longitudinal direction of the vehicle body, and reinforces the vehicle body frame structure including the locker 4 and the front pillar 5.

Figure 3:
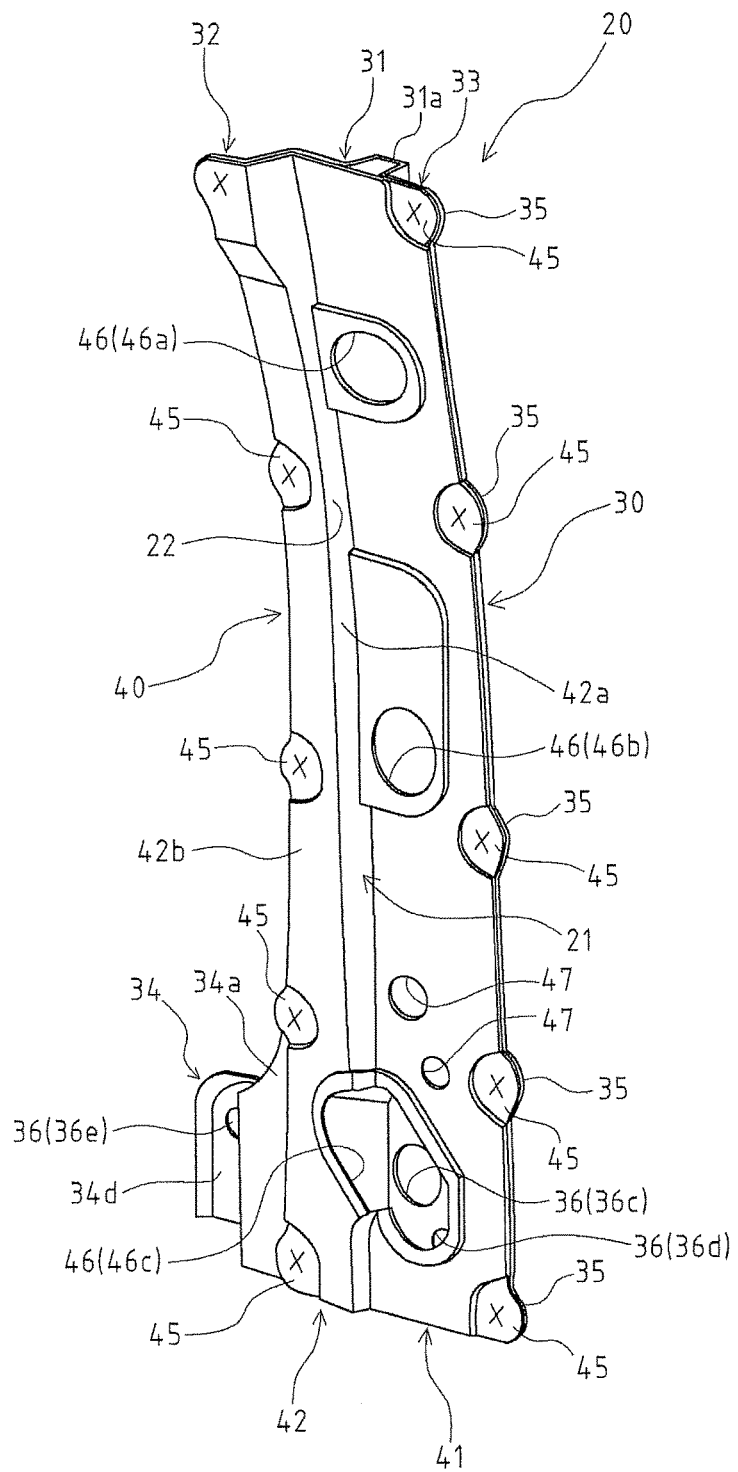
FIG. 3 is a perspective view showing a gusset member according to the first embodiment of the present invention.

As shown in FIG. 1 and FIG. 3, the gusset member 20 is configured to form an approximately rectangular plate-like external profile having a relatively narrow width as a whole. The gusset member 20 is provided in a state where the gusset member 20 is brought into contact with a front side of the lower portion of the front pillar 5 in the longitudinal direction of the vehicle body in a posture where plate surfaces of the gusset member 20 on both sides are directed in the longitudinal direction of the vehicle body and the longitudinal direction of the gusset member 20 extend in the vertical direction of the vehicle body. That is, as shown in FIG. 2, the gusset member 20 is positioned between the fender liner 16 which constitutes the wheel housing and the front pillar 5 behind the wheel housing of the front tire 3 in the longitudinal direction of the vehicle and hence, the gusset member 20 assumes a state where the gusset member 20 is covered by the fender liner 16 from a front side in the longitudinal direction of the vehicle body.

Figure 4:
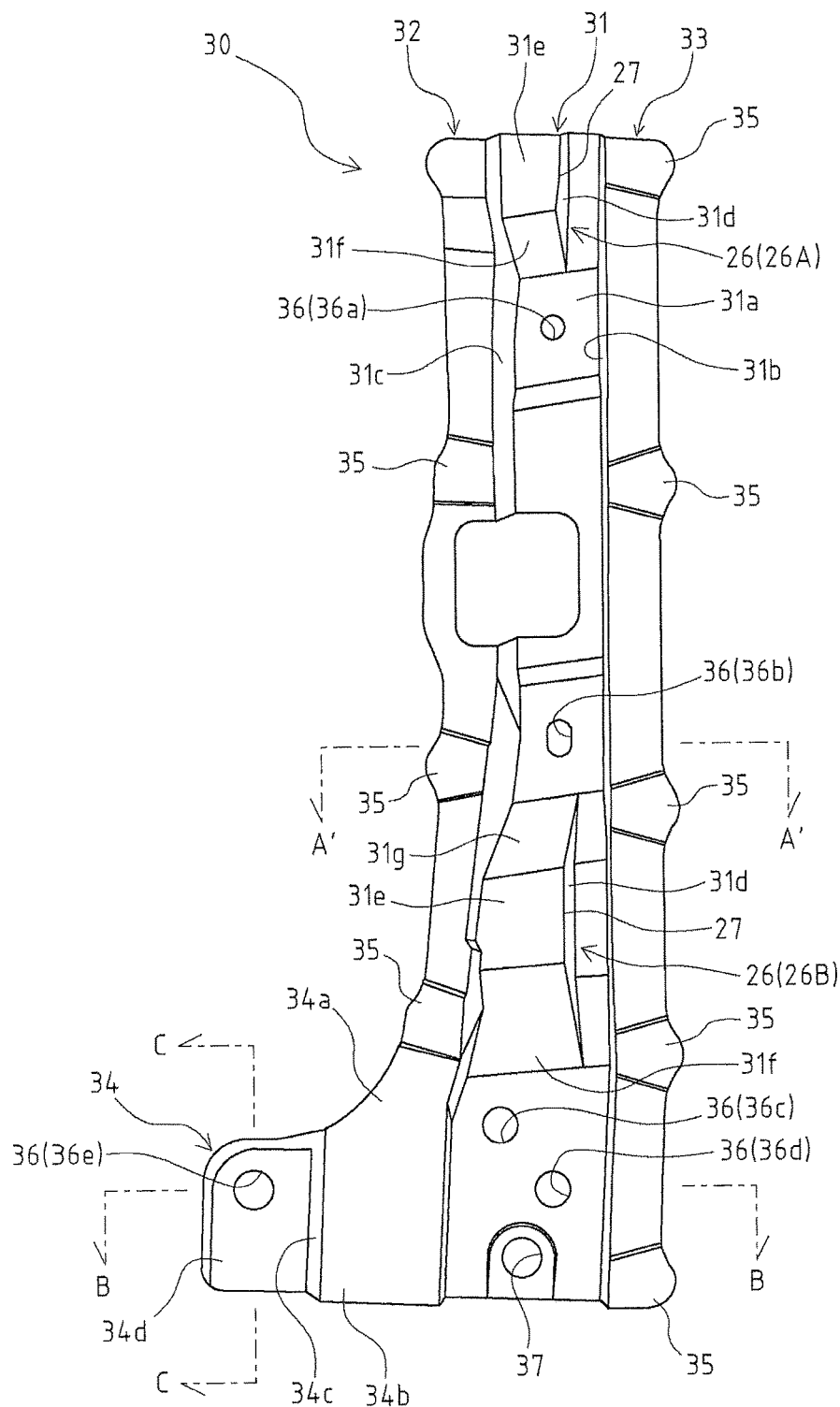
FIG. 4 is a front view showing a rear member which is one of constitutional members of the gusset member according to the first embodiment of the present invention.
Figure 5:
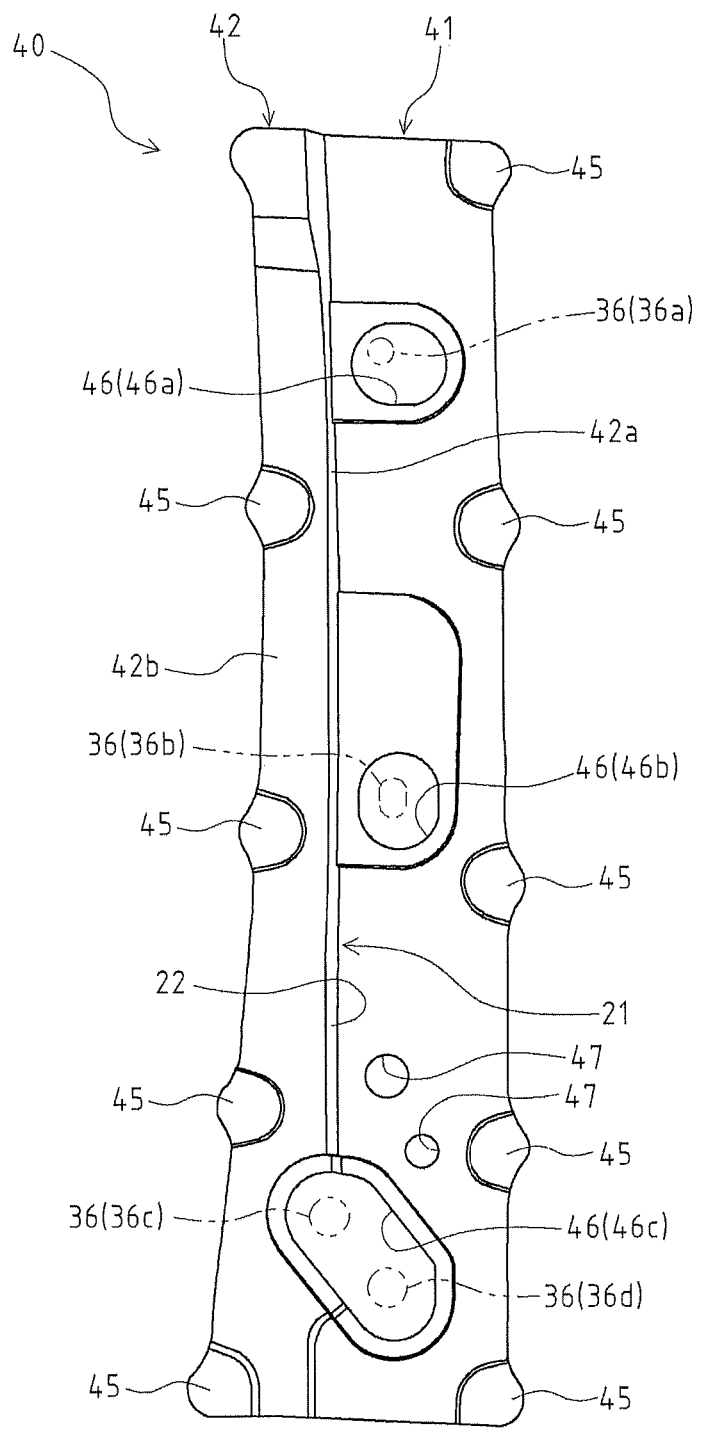
FIG. 5 is a front view showing a front member which is one of constitutional members of the gusset member according to the first embodiment of the present invention.

As shown in FIG. 3, FIG. 4 and FIG. 5, the gusset member 20 includes: a gusset rear panel 30 which is a rear side member constituting a portion of the gusset member 20 on a rear side in the longitudinal direction of the vehicle body; and a gusset front panel 40 which is a front side member constituting a portion of the gusset member 20 on a front side in the longitudinal direction of the vehicle body. That is, in a state where the gusset member 20 is mounted on the vehicle body, the gusset rear panel 30 is positioned on a rear side in the longitudinal direction of the vehicle body, and the gusset front panel 40 is positioned on a front side in the longitudinal direction of the vehicle body.

The gusset rear panel 30 and the gusset front panel 40 are plate-like members having approximately same rectangular plate-like external profiles. The gusset rear panel 30 and the gusset front panel 40 constitute the gusset member 20 by being fixed to each other in an overlapping manner. The gusset rear panel 30 and the gusset front panel 40 are made to overlap with each other and are fixed to each other in a state where both panels are formed into approximately same external profiles (in a state where external profiles of both panels are approximately aligned with each other). Accordingly, when viewed in a state where the gusset member 20 is mounted on the vehicle body from a front side in the longitudinal direction of the vehicle body, the gusset front panel 40 occupies the most portion (approximately whole portion) of the gusset member 20 which appears in external appearance.

The gusset rear panel 30 and the gusset front panel 40 are members formed into predetermined shapes respectively by applying predetermined workings to steel plates respectively having predetermined plate thicknesses (for example, approximately 2 mm). That is, the gusset member 20 of this embodiment is, as a whole, an iron-made member made of a steel material. In this embodiment, the gusset rear panel 30 is made of a steel plate having a larger thickness than a steel plate used for forming the gusset front panel 40. However, both panels may have the same plate thickness, or a plate thickness of the gusset front panel 40 set larger than a plate thickness of the gusset rear panel 30.

The gusset member 20 is provided in a state where the gusset member 20 is fixed to the vehicle body frame structure which includes the locker 4 and the front pillar 5 integrally formed with each other. In this embodiment, the gusset member 20 which is constituted of the gusset rear panel 30 and the gusset front panel 40 integrally formed with each other is fixed to the vehicle body frame structure by fixing a portion of the gusset rear panel 30 to the vehicle body frame structure.

The gusset member 20 is provided at the position where the gusset member 20 overlaps with at least the front tire 3 in the vertical direction of the vehicle body. That is, the gusset member 20 which is positioned behind the front tire 3 in the longitudinal direction of the vehicle body has a portion which overlaps with the front tire 3 in the longitudinal direction of the vehicle body at least at a portion in the vertical direction of the vehicle body as viewed from a front side in the longitudinal direction of the vehicle body.

In this manner, the gusset member 20 according to this embodiment is constituted of: the gusset rear panel 30 which is fixed to the vehicle body frame structure; and the gusset front panel 40 which overlaps with the gusset rear panel 30 on a front side in the longitudinal direction of the vehicle body and is fixed to the gusset rear panel 30. The mutual joint structure between the gusset rear panel 30 and the gusset front panel 40 and the fixing structure for fixing the gusset member 20 to the vehicle body frame structure will be described later.

The gusset member 20 is a member provided for covering at least a lower portion of a front side of the front pillar 5 in the longitudinal direction of the vehicle body, and includes, on a front side in the longitudinal direction of the vehicle body, a stepped portion 21 which extends in the vertical direction of the vehicle body and is configured to position a portion thereof on an inner side in the vehicle width direction on a more front side in the longitudinal direction of the vehicle body relative to an outer side in the vehicle width direction. The stepped portion 21 is a portion which is formed along an edge portion of the body portion on an inner side in the vehicle width direction on an outer side of the gusset member 20 in the vehicle width direction, and forms a stepped surface 22 which is raised toward a front side in the longitudinal direction of the vehicle body with respect to the body portion facing the outside in the vehicle width direction.

Hereinafter, the gusset member 20 is explained in detail. In the explanation made hereinafter, in the gusset member 20, assume a gusset rear panel 30 side as a back surface side, and a gusset front panel 40 side as a front surface side. Further, assume the width direction of the gusset member 20 corresponding to the vehicle width direction, that is, the width direction of the gusset rear panel 30 and the width direction of the gusset front panel 40 as "gusset width direction", and the longitudinal direction of the gusset member 20 corresponding to the vertical direction of the vehicle body, that is, the longitudinal direction of the gusset rear panel 30 and the gusset front panel 40 as "gusset longitudinal direction".

Firstly, the gusset rear panel 30 is explained. As shown in FIG. 2 and FIG. 4, the gusset rear panel 30 is configured such that a transverse cross-sectional shape (a horizontal cross sectional shape) taken along a plane perpendicular to the gusset longitudinal direction has an approximately hat shape as a whole. The gusset rear panel 30 is provided in a state where an opening side of such a transverse cross-sectional shape faces a front side in the longitudinal direction of the vehicle body (a gusset front panel 40 side), that is, in a state where a projection side having such a transverse cross-sectional shape faces a rear side in the longitudinal direction of the vehicle body (back surface side).

The gusset rear panel 30 includes, as portions which form a transverse cross-sectional shape having an approximately hat shape, a gusset rear panel body portion 31 which forms an intermediate portion in the gusset width direction, and an inner flange portion 32 and an outer flange portion 33 provided on both sides in the gusset width direction with respect to the gusset rear panel body portion 31. The gusset rear panel body portion 31, the inner flange portion 32 and the outer flange portion 33 extend over the approximately whole gusset rear panel 30 in the gusset longitudinal direction, are arranged parallel to each other in the gusset width direction, and constitute the approximately whole gusset rear panel 30.

The gusset rear panel body portion 31 includes a portion having an approximately "horizontal U" shape or an approximately "U" shape in transverse cross section where a front surface side is set as an opening side. Such a portion is, in a transverse cross-sectional shape of the gusset rear panel 30, constituted of: a rear wall portion 31a which is an end surface portion on a projection side; an outer side wall portion 31b which is raised toward a front side in the longitudinal direction of the vehicle body on an outer side of the rear wall portion 31a in the vehicle width direction; and an inner side wall portion 31c which is raised toward a front side in the longitudinal direction of the vehicle body on an inner side of the rear wall portion 31a in the vehicle width direction.

The rear wall portion 31a is a plate-like portion arranged approximately perpendicular to the longitudinal direction of the vehicle body, that is, a plate-like portion which has plate surfaces thereof on both sides directed in the longitudinal direction of the vehicle body, and constitutes an end surface portion of the gusset member 20 on a back surface side. That is, the rear wall portion 31a is a portion configured such that an intermediate portion in the gusset width direction of the wall surface portion on a back surface side of the gusset member 20 partially projects toward a rear side in the longitudinal direction of the vehicle body. The rear wall portion 31a is, in the gusset member 20 fixed to the vehicle body frame structure as described later, included in a portion fixed to the vehicle body frame structure.

The outer side wall portion 31b is a plate-like portion which is formed such that the outer side wall portion 31b is bent toward a front side in the longitudinal direction of the vehicle body from an end portion of the rear wall portion 31a on an outer side in the vehicle width direction as viewed in a transverse cross section. The outer flange portion 33 is connected to an end portion of the outer side wall portion 31b.

The inner side wall portion 31c is a plate-like portion which is formed such that the inner side wall portion 31c is bent obliquely toward a front side in the longitudinal direction of the vehicle body as well as toward an inner side in the vehicle width direction from an end portion of the rear wall portion 31a on an inner side in the vehicle width direction as viewed in a transverse cross section. The inner side wall portion 31c extends toward a more front side in the longitudinal direction of the vehicle body than the outer side wall portion 31b with respect to the rear wall portion 31a. The inner flange portion 32 is connected to an end portion of the inner side wall portion 31c.

The inner flange portion 32 is a plate-like portion which extends from an edge portion of the gusset rear panel body portion 31 on an inner side in the vehicle width direction, that is, from an edge portion of the inner side wall portion 31c which is a bent portion with respect to the rear wall portion 31a, and corresponds to a flange portion of the gusset rear panel 30 on an inner side in the vehicle width direction in a transverse cross-sectional shape having an approximately hat shape. In this embodiment, the inner flange portion 32 is provided in an inclined manner such that the inner flange portion 32 is slightly inclined toward a rear side in the longitudinal direction of the vehicle body from an outer side in the vehicle width direction to an inner side in the vehicle width direction with respect to a plane perpendicular to the longitudinal direction of the vehicle body.

The outer flange portion 33 is a plate-like portion which extends from an edge portion of the gusset rear panel body portion 31 on an outer side in the vehicle width direction, that is, from an edge portion of the outer side wall portion 31b which is a bent portion with respect to the rear wall portion 31a, and corresponds to a flange portion of the gusset rear panel 30 on an outer side in the vehicle width direction in a transverse cross-sectional shape having an approximately hat shape. In this embodiment, the outer flange portion 33 is provided so as to follow the plane perpendicular to the longitudinal direction of the vehicle body.

As shown in FIG. 4, the inner flange portion 32 and the outer flange portion 33 are approximately strip-like portions having a narrow width with longitudinal directions thereof set in the gusset longitudinal direction as viewed in a front elevation view (as viewed in a front view) of the gusset rear panel 30. Between the inner flange portion 32 and the outer flange portion 33 on left and right sides, a groove-like portion having a bottom side on a rear side (a back surface side) in the longitudinal direction of the vehicle body is formed by the gusset rear panel body portion 31.

The gusset rear panel 30 also includes a lower end extending portion 34 which extends toward an inner side in the vehicle width direction on an end portion thereof on a lower side in the vertical direction of the vehicle body. The lower end extending portion 34 is formed as follows. In a front elevation view of the gusset rear panel 30, a lower end portion of the lower end extending portion 34 has a length which is approximately ⅕ of a whole length of the gusset rear panel 30 and projects toward an inner side in the vehicle width direction such that a size of the lower end portion becomes approximately two times as large as sizes of other portions of the gusset rear panel 30 in the gusset width direction. Accordingly, with the formation of the lower end extending portion 34, the size of the lower end portion of the gusset rear panel 30 in the gusset width direction is partially increased approximately twice. The lower end extending portion 34 is a portion which extends toward an inner side in the vehicle width direction from the inner flange portion 32, and is formed by way of a curve forming portion 34a which gradually expands a size of the gusset rear panel 30 in the gusset width direction toward an inner side in the vehicle width direction along a smooth curve from an upper side to a lower side with respect to an upper-side portion of the gusset rear panel 30.

To observe the gusset rear panel 30 as a whole, in a front elevation view, an edge portion of the gusset rear panel 30 on an outer side in the vehicle width direction is formed of the outer flange portion 33 in an approximately straight-line shape along the vertical direction of the vehicle body. On the other hand, an edge portion of the gusset rear panel 30 on an inner side in the vehicle width direction is gradually expanded toward an inner side in the vehicle width direction from an upper side to the curve forming portion 34a by the inner flange portion 32, and the width of the gusset rear panel 30 is sharply increased by the lower end extending portion 34 by way of the curve forming portion 34a. The gusset rear panel 30 having the lower end extending portion 34 as described above is configured to be formed in an approximately "L" shape or an approximately long boot shape as a whole in a front elevation view.

The lower end extending portion 34 has a predetermined bent shape which is bent in the longitudinal direction of the vehicle body. To be more specific, as shown in FIG. 6, as viewed in a cross sectional plan view, the lower end extending portion 34 includes: an extending wall portion 34b which is an extending portion toward an inner side in the vehicle width direction from the inner flange portion 32; a side wall portion 34c which is a plate like portion formed so as to be bent toward a rear side in the longitudinal direction of the vehicle body from an end portion of the extending wall portion 34b on an inner side in the vehicle width direction; and an end wall portion 34d which is a plate like portion formed so as to be bent toward the inner side in the vehicle width direction from an end portion of the side wall portion 34c on a rear side in the longitudinal direction of the vehicle body.

The end wall portion 34d which constitutes the lower end extending portion 34 is included in portions fixed to the vehicle body frame structure in the gusset member 20 fixed to the vehicle body frame structure as described later. In this embodiment, the end wall portion 34d is positioned slightly behind the rear wall portion 31a of the gusset rear panel body portion 31 in the longitudinal direction of the vehicle body (see FIG. 6).

Next, the gusset front panel 40 is explained. As shown in FIG. 2 and FIG. 5, the gusset front panel 40 is a member which constitutes a portion of the gusset member 20 on a front side in the longitudinal direction of the vehicle body, and is also a member for forming the stepped portion 21 which the gusset member 20 has on a front side in the longitudinal direction of the vehicle body as described previously.

The gusset front panel 40 includes: a gusset front panel body portion 41 which is formed in an approximately planer shape so as to form an approximately straight line shape along the vehicle width direction in a transverse cross-sectional shape; and a step forming portion 42 which is provided on an inner side of the gusset front panel body portion 41 in the vehicle width direction and forms the stepped portion 21. The gusset front panel body portion 41 and the step forming portion 42 approximately extend over the whole gusset front panel 40 in the gusset longitudinal direction, are arranged parallel to each other in the gusset width direction, and constitute the whole gusset front panel 40.

In the gusset front panel 40 having an approximately rectangular-plate shape profile, the gusset front panel body portion 41 is an approximately rectangular plate-like portion constituting a portion occupying half or more (approximately ⅔ to ¾ in this embodiment) on an outer side in the vehicle width direction in the gusset width direction. That is, the gusset front panel body portion 41 is a strip-like portion along the gusset longitudinal direction having a relatively large width with respect to the step forming portion 42.

In the gusset front panel 40 having an approximately rectangular plate-like profile, the step forming portion 42 is an approximately rectangular plate-like portion constituting a portion on a more inner side in the vehicle width direction than the gusset front panel body portion 41 in the gusset width direction. That is, the step forming portion 42 is a strip-like portion along the gusset longitudinal direction having a relatively narrow width with respect to the gusset front panel body portion 41.

The step forming portion 42 is a portion for forming the stepped portion 21 with respect to the gusset front panel body portion 41, and most of the step forming portion 42 is positioned on a front side in the longitudinal direction of the vehicle body with respect to the gusset front panel body portion 41 by an amount of a step formed by the stepped portion 21. That is, the step forming portion 42 forms the stepped portion 21 which is raised toward a front side in the longitudinal direction of the vehicle body with respect to the gusset front panel body portion 41 and extends along an edge portion of the gusset front panel body portion 41 on an inner side in the vehicle width direction.

To be more specific, as shown in FIG. 2, the step forming portion 42 includes, in a transverse cross-sectional shape of the gusset front panel 40: a stepped surface forming portion 42a which forms the stepped surface 22; and an inner flange portion 42b extending toward an inner side in the vehicle width direction from the stepped surface forming portion 42a. The stepped surface forming portion 42a is a plate-like portion formed so as to be bent toward a front side in the longitudinal direction of the vehicle body from an end portion of the gusset front panel body portion 41 on an inner side in the vehicle width direction. The inner flange portion 42b is a plate-like portion formed so as to be bent toward an inner side in the vehicle width direction from an end portion of the stepped surface forming portion 42a on a front side in the longitudinal direction of the vehicle body.

That is, in the step forming portion 42, the stepped surface 22 which faces an outer side in the vehicle width direction is formed on a front side of the gusset front panel 40 in the longitudinal direction of the vehicle body, that is, on a front surface side of the gusset member 20 by the stepped surface forming portion 42a raised toward a front side in the longitudinal direction of the vehicle body along an edge portion of the gusset front panel body portion 41 on an inner side in the vehicle width direction. In this embodiment, the stepped surface forming portion 42a is formed in an inclined manner such that the stepped surface forming portion 42a is directed obliquely toward a front side in the longitudinal direction of the vehicle body as well as toward an inner side in the vehicle width direction. Accordingly, the stepped surface 22 which is a surface of the stepped surface forming portion 42a on a front side in the longitudinal direction of the vehicle body forms a face which faces a front side in the longitudinal direction of the vehicle body as well as toward an outer side in the vehicle width direction along the inclination of the stepped surface forming portion 42a.

In the step forming portion 42 which forms the stepped portion 21 with respect to the gusset front panel body portion 41 in this manner, the inner flange portion 42b is positioned on a front side in the longitudinal direction of the vehicle body with respect to the gusset front panel body portion 41 by an amount of a step formed by the stepped portion 21. In other words, the inner flange portion 42b is formed by way of the stepped surface forming portion 42a with respect to the gusset front panel body portion 41 and hence, the stepped surface forming portion 42a extends toward a front side in the longitudinal direction of the vehicle body from the gusset front panel body portion 41 and hence, the inner flange portion 42b is positioned on a more front side in the longitudinal direction of the vehicle body than the gusset front panel body portion 41.

An approximately rectangular shaped profile of the gusset front panel 40 where the vertical direction as viewed in a front view is set as the longitudinal direction of the gusset front panel 40 is approximately equal to the profile of portions of the gusset rear panel 30 other than the lower end extending portion 34 as viewed in a front view. The gusset rear panel 30 and the gusset front panel 40 are joined to each other in a state where the gusset rear panel 30 and the gusset front panel 40 overlap with each other by making approximately longitudinal rectangular-shaped profile shaped portions as viewed in a front view in common approximately agree with each other. Accordingly, to observe the gusset member 20 in a front view, with respect to the gusset rear panel 30 positioned on a back surface side of the gusset front panel 40, a portion of the lower end extending portion 34 is brought into a state where the portion is exposed to the outside without being covered by the gusset front panel 40 from a front surface side.

Next, the mutual joint structure between the gusset rear panel 30 and the gusset front panel 40 is explained. The gusset rear panel 30 and the gusset front panel 40 are joined to each other by performing spot welding at a plurality of portions. Mutually overlapping and contacting portions are present between the gusset rear panel 30 and the gusset front panel 40. By joining such portions to each other by spot welding, the gusset rear panel 30 and the gusset front panel 40 are fixed to each other as a whole thus constituting the integral gusset member 20.

The gusset rear panel 30 and the gusset front panel 40 overlap with each other in a mode where the gusset front panel 40 closes an opening side of an approximately hat shape of the gusset rear panel 30 in a transverse cross-sectional shape. In a state where the gusset rear panel 30 and the gusset front panel 40 overlap with each other, the inner flange portion 32 and the inner flange portion 42b face each other, and the outer flange portion 33 and the portion of the gusset front panel body portion 41 on an outer side in the vehicle width direction face each other. These mutually facing portions form edge portions on both sides in the vehicle width direction in the approximately longitudinal rectangular profile—shaped portions where the gusset rear panel 30 and the gusset front panel 40 are made to be approximately aligned with each other. A plurality of portions which are spaced apart from each other in the gusset longitudinal direction at both respective edge portions become weld portions where spot welding is performed.

To be more specific, as shown in FIG. 3, in the gusset member 20 of this embodiment, as described above, at the inner flange portion 32 and the inner flange portion 42b which face each other as well as at the outer flange portion 33 and the portion of the gusset front panel body portion 41 on an outer side in the vehicle width direction which face each other, a weld portion where spot welding is performed is provided at five portions including both end portions in the gusset longitudinal direction. Accordingly, in the gusset member 20, the weld portion where spot welding is performed exists at ten portions in total. In FIG. 3, the weld portions where spot welding is performed are indicated by "x".

As shown in FIG. 4 and FIG. 5, joining projecting portions 35, 45 are suitably provided at weld portions of the gusset rear panel 30 and the gusset front panel 40 for joining these panels to each other. The joining projecting portions 35, 45 are portions which project in a gentle mountain-like shape at edge portions on both sides in the gusset width direction, and project in a spotted manner toward sides opposite to each other with respect to other portions. That is, the joining projecting portions 35 of the gusset rear panel 30 project toward a front surface side, that is, a gusset front panel 40 side, while the joining projecting portions 45 of the gusset front panel 40 project toward a back surface side, that is, a gusset rear panel 30 side.

To be more specific, in this embodiment, in the gusset rear panel 30, on the outer flange portion 33 which constitutes the edge portion on an outer side in the vehicle width direction, the joining projecting portion 35 is formed at five portions, that is, at all weld portions. On the inner flange portion 32 which constitutes the edge portion on an inner side in the vehicle width direction, the joining projecting portion 35 is formed at three portions excluding positions at upper and lower ends. On the other hand, in the gusset front panel 40, on the edge portion of the gusset front panel body portion 41 on an outer side in the vehicle width direction which constitutes an edge portion on an outer side in the vehicle width direction, the joining projecting portion 45 is formed at five portions, that is, at all weld portions. On the inner flange portion 42b which constitutes the edge portion on an inner side in the vehicle width direction, the joining projecting portion 35 is formed at four portions excluding the position at the upper end.

At portions where the joining projecting portions 35, 45 are present in both weld portions which correspond to each other between the gusset rear panel 30 and the gusset front panel 40, the joining projecting portion 35 and the joining projecting portion 45 overlap with each other in a state where a projecting-side surface of the joining projecting portion 35 and a projecting-side surface of the joining projecting portion 45 are brought into contact with each other, and the joining projecting portion 35 and the joining projecting portion 45 are joined to each other by spot welding.

With respect to the mutual joining structure between the gusset rear panel 30 and the gusset front panel 40, shapes and the like of welding positions, the number of weld portions, a shape of a weld portion and the like are not particularly limited. Other welding methods such as arc welding may be used besides spot welding. Further, the structure may be adopted where the gusset rear panel 30 and the gusset front panel 40 are fixed to each other by a fixing member such as bolts or rivets besides welding.

The gusset member 20 which is constituted by joining the gusset rear panel 30 and the gusset front panel 40 to each other as described above is formed into a hollow shape by the portions which are configured such that the gusset front panel 40 closes an opening side of an approximately hat shape of the gusset rear panel 30 in a transverse cross-sectional shape. In the gusset member 20 of this embodiment, the wall surface structure having an approximately closed cross-sectional shape or a closed cross-sectional shape as a transverse cross-sectional shape is constituted by the gusset rear panel 30 and the gusset front panel 40, and the space 24 which opens on both end sides in the gusset longitudinal direction is formed (see FIG. 2).

In this manner, the gusset member 20 is formed into a hollow shape or is formed of a hollow body having an approximately closed cross-sectional shape or a closed cross-sectional shape by the wall surface structure which sets the vertical direction of the vehicle body as the longitudinal direction thereof and includes a wall portion on a rear side in the longitudinal direction of the vehicle body and a wall portion on a front side in the longitudinal direction of the vehicle body in a transverse cross-sectional shape thereof.

In the gusset member 20 of this embodiment, the rear wall portion 31a of the gusset rear panel 30 corresponds to the wall portion on a rear side in the longitudinal direction of the vehicle body having an approximately closed cross-sectional shape, and the gusset front panel body portion 41 of the gusset front panel 40 which faces the rear wall portion 31a corresponds to the wall portion on a front side in the longitudinal direction of the vehicle body in the same manner. The rear wall portion 31a and the gusset front panel body portion 41 are wall surface portions which are arranged approximately parallel to each other with a distance therebetween in the longitudinal direction of the vehicle body, and constitute portions on front and rear sides in the longitudinal direction of the vehicle body of the wall surface structure having an approximately closed cross-sectional shape or a closed cross-sectional shape as a transverse cross-sectional shape. For example, with respect to the gusset longitudinal direction of the gusset member 20, the portions where the joining projecting portion 35 and the joining projecting portion 45 are present on both sides in the vehicle width direction have a closed cross-sectional shape as a transverse cross-sectional shape thereof, and the portions other than such portions have an approximately closed cross-sectional shape as the transverse cross-sectional shape thereof.

In the hollow inside (hollow body) of the gusset member 20, bulk shaped portions 26 are disposed for suppressing the deformation of the gusset member 20, particularly the deformation of the gusset front panel 40 caused by the collision involving the front tire 3 on the gusset front panel 40. The bulk shaped portion 26 is a shaped portion where a ridge 27 is formed and a distance in the longitudinal direction of the vehicle body between the rear wall portion 31a which is a wall portion on a rear side in the longitudinal direction of the vehicle body and the gusset front panel body portion 41 which is a wall portion on a front side in the longitudinal direction of the vehicle body is partially narrowed.

As shown in FIG. 4, in this embodiment, the bulk shaped portion 26 is disposed at two portions of the gusset rear panel 30, that is, an upper end portion of the gusset rear panel 30 and a portion of the gusset rear panel 30 close to a lower side of the gusset rear panel 3. The bulk shaped portion 26 is a projecting shaped portion formed on the gusset rear panel body portion 31 of the gusset rear panel 30 in a projecting manner toward a front side in the longitudinal direction of the vehicle body from the rear wall portion 31a.

In this embodiment, the bulk shaped portions 26 are formed at positions close to the inner side wall portion 31c in the gusset width direction, and also are formed in a state where the bulk shaped portions 26 are attached to the rear wall portion 31a and the inner side wall portion 31c. That is, the bulk shaped portion 26 constitutes a corner portion which forms a ridge 27 extending along the vertical direction of the vehicle body at a position diagonal to a corner portion formed by the rear wall portion 31a and the inner side wall portion 31c in a transverse cross-sectional shape of the gusset member 20. Accordingly, the bulk shaped portion 26 is a portion which is formed such that the ridge portion (corner portion) formed by the rear wall portion 31a and the inner side wall portion 31c extending along the gusset longitudinal direction is partially recessed from a back surface side of the gusset rear panel 30 formed of an integral plate-like member.

Figure 8:
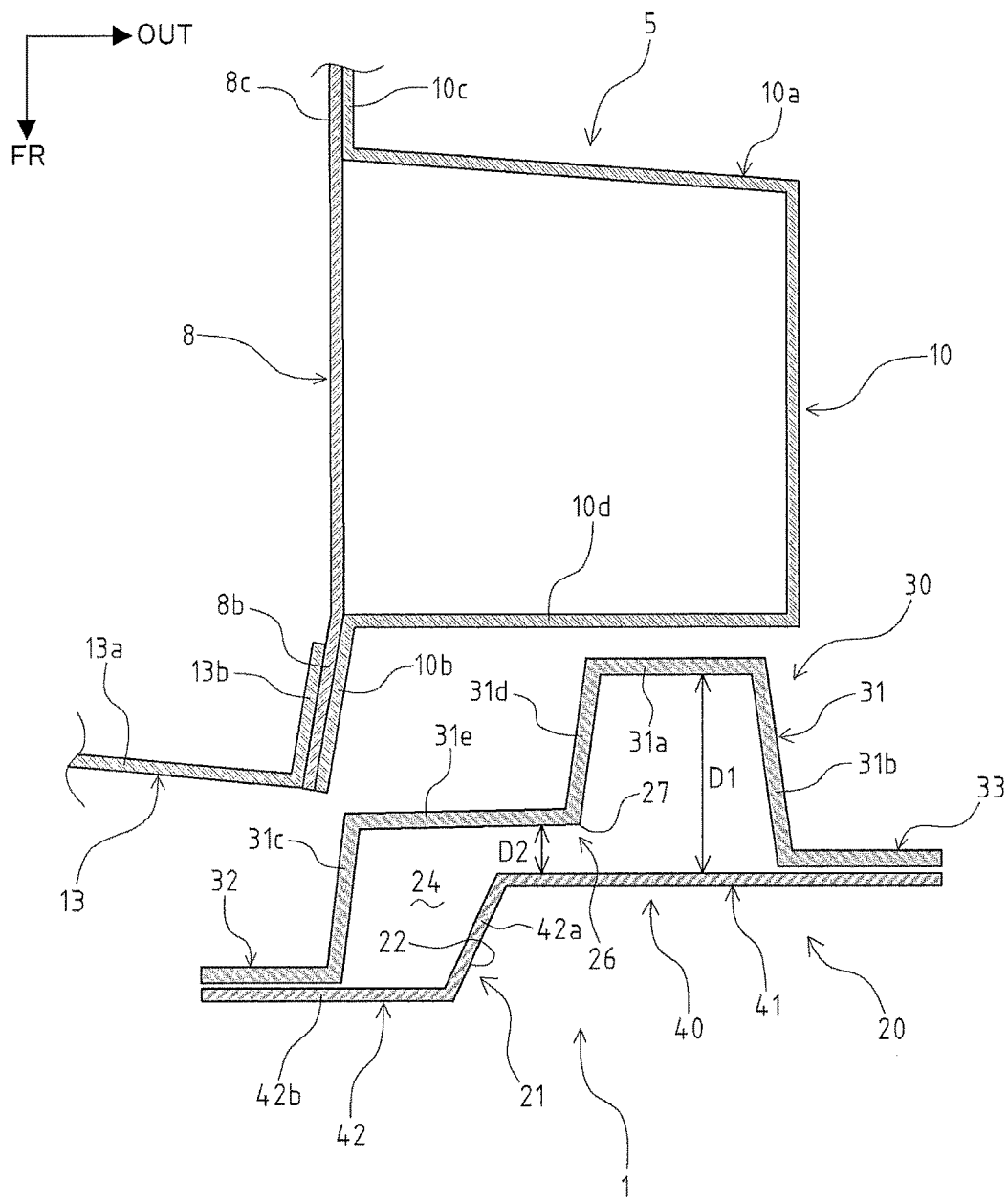
FIG. 8 is a horizontal cross-sectional view schematically showing the vehicle front part structure according to the first embodiment of the present invention.

To be more specific, as shown in FIG. 4 and FIG. 8, the bulk shaped portion 26 includes, in a transverse cross-sectional shape of the gusset rear panel 30: an outer bulk surface portion 31d which is a plate-like portion formed so as to be bent toward a front side in the longitudinal direction of the vehicle body from an inner end portion of the rear wall portion 31a in the vehicle width direction; and a front bulk surface portion 31e which is a plate-like portion formed so as to be bent toward an inner side in the vehicle width direction from an end portion of the outer bulk surface portion 31d on a front side in the longitudinal direction of the vehicle body, and is connected to an intermediate portion of the inner side wall portion 31c in the longitudinal direction of the vehicle body. That is, the outer bulk surface portion 31d and the front bulk surface portion 31e constitute, in a transverse cross-sectional shape, a step like (zigzag) portion together with the rear wall portion 31a and the inner side wall portion 31c (see FIG. 8). In FIG. 8, the constitution of some members which constitute the front pillar 5 is omitted from the drawing.

In the bulk shaped portion 26 having such a constitution, the ridge 27 which extends along the vertical direction of the vehicle body is formed by the corner portion formed by the outer bulk surface portion 31d and the front bulk surface portion 31e. The front bulk surface portion 31e formed with respect to the rear wall portion 31a by way of the outer bulk surface portion 31d exists on a more front side in the longitudinal direction of the vehicle body than the rear wall portion 31a, that is, at a position close to the gusset front panel body portion 41 by an amount corresponding to the interposed outer bulk surface portion 31d. Due to such a constitution, as shown in FIG. 8, the bulk shaped portion 26 partially narrows a distance in the longitudinal direction of the gusset between the rear wall portion 31a and the gusset front panel body portion 41 as a distance D2 between the front bulk surface portion 31e and the gusset front panel body portion 41 compared to a distance D1 in the longitudinal direction of the vehicle body at a portion where the bulk shaped portion 26 is not formed.

Further, as shown in FIG. 4, out of two bulk shaped portions 26, that is, the upper and lower bulk shaped portions 26 which the gusset rear panel 30 includes, the upper bulk shaped portion 26A formed on an upper end portion has an upper side which constitutes an upper end of the gusset rear panel 30 opened, and includes a lower bulk surface portion 31f which is formed in a state where the lower bulk surface portion 31f closes a lower side of a portion surrounded by the outer bulk surface portion 31d, the front bulk surface portion 31e and the inner side wall portion 31c. The lower bulk surface portion 31f is formed into an inclined surface shape extending downward toward a rear side in the longitudinal direction of the vehicle body from a front side in the longitudinal direction of the vehicle body in the direction from an upper side in the vertical direction of the vehicle body to a lower side in the vertical direction of the vehicle body.

On the other hand, out of two bulk shaped portions 26, that is, the upper and lower bulk shaped portions 26, the lower bulk shaped portion 26B formed on a portion close to a lower side includes, in addition to the lower bulk surface portion 31f, an upper bulk surface portion 31g formed in a state where the upper bulk surface portion 31g closes an upper side of a portion surrounded by the outer bulk surface portion 31d, the front bulk surface portion 31e and the inner side wall portion 31c. The upper bulk surface portion 31g is formed into an inclined surface shape extending downward toward a rear side in the longitudinal direction of the vehicle body from a front side in the longitudinal direction of the vehicle body in the direction from a lower side in the vertical direction of the vehicle body to an upper side in the vertical direction of the vehicle body.

As described above, in this embodiment, the bulk shaped portions 26 are formed as parts of the gusset rear panel 30 formed of an integral member. That is, in the gusset rear panel 30 formed of an integral steel plate having a predetermined plate thickness, the bulk shaped portions 26 are formed as bent shaped portions of the steel plate.

Next, the fixing structure for fixing the gusset member 20 to the vehicle body frame structure is explained. The gusset member 20 is fixed to the vehicle body frame structure by bolt fastening at plural portions.

As described previously, the gusset member 20 fixes the portions of the gusset rear panel 30 to the vehicle body frame structure. For this end, a plurality of fastening holes 36 for bolt fastening are formed in the gusset rear panel 30. In this embodiment, the fastening holes 36 are formed at five portions in total, wherein the fastening holes 36 are formed in the rear wall portion 31a of the gusset rear panel body portion 31 at four portions and in the end wall portion 34d of the lower end extending portion 34 at one portion (see FIG. 4).

To be more specific, as shown in FIG. 4, in the rear wall portion 31a of the gusset rear panel body portion 31, as the fastening holes 36, in order from an upper side in the vertical direction of the vehicle body, a first fastening hole 36a is formed at a position close to an upper side, a second fastening hole 36b is formed at a position in an approximately center portion in the vertical direction, and a third fastening hole 36c and a fourth fastening hole 36d are formed in a lower end portion. Further, in an end wall portion 34d of the lower end extending portion 34, a fifth fastening hole 36e is formed at a position close to an upper side as the fastening hole 36.

By forming the plurality of fastening holes 36 in the gusset rear panel 30 in this manner, the gusset member 20 is fastened and fixed to the vehicle body frame structure using bolts 51 and nuts 52 (see FIG. 2, FIG. 6 and FIG. 7). That is, each bolt 51 penetrates the gusset rear panel 30 through each fastening hole 36 from a front side in the longitudinal direction of the vehicle body, and penetrates the predetermined member which constitutes the vehicle body frame structure, and the nut 52 is threadedly engaged with a portion of the bolt 51 penetrating toward a rear side in the longitudinal direction of the vehicle body.

Accordingly, operation holes 46 are formed in the gusset front panel 40 for enabling a bolt fastening operation to fasten the gusset member 20 to the vehicle body frame structure through the respective fastening holes 36 formed in the gusset rear panel 30. The operation hole 46 is formed with a size which embraces an opening range of the fastening hole 36 so as to expose the fastening hole 36 to the outside of the gusset member 20 as viewed in a front view of the gusset member 20.

To be more specific, as shown in FIG. 5, in the gusset front panel 40, as the operation holes 46, in order from an upper side in the vertical direction of the vehicle body, a first operation hole 46a corresponding to the first fastening hole 36a, a second operation hole 46b corresponding to the second fastening hole 36b, and a third operation hole 46c corresponding to the third fastening hole 36c and the fourth fastening hole 36d are formed. With respect to the third fastening hole 36c and the fourth fastening hole 36d, these fastening holes 36 are disposed at positions relatively close to each other. Accordingly, the common third operation hole 46c which is formed so as to embrace opening ranges of both fastening holes 36 is formed. The lower end extending portion 34 in which the fifth fastening hole 36e is formed is, as described previously, in a state where the lower end extending portion 34 is exposed to the outside without being covered by the gusset front panel 40 from a front surface side.

In the vehicle front structure 1 of this embodiment, with respect to the fixing portions which fix the gusset member 20 to the vehicle body frame structure by bolt fastening, the fixing portion constituted of the first fastening hole 36a and the second fastening hole 36b is fixed to the front pillar 5. The fixing portion constituted of the third fastening hole 36c and the fourth fastening hole 36d is fixed to the locker 4. The fixing portion constituted of the fifth fastening hole 36e is fixed to the torque box 15. The detail of the respective fixing portions is as follows.

In the fixing portion constituted of the first fastening hole 36a or the second fastening hole 36b, as shown in FIG. 2, the rear wall portion 31a of the gusset rear panel body portion 31 is brought into contact with the wall surface portion 10d on a front side in the longitudinal direction of the vehicle body constituting the body portion 10a of the side member outer panel 10 which is a constitutional member of the front pillar 5 in an overlapping state from a front side in the longitudinal direction of the vehicle body. Further, inside the body portion 10a of the side member outer panel 10, that is, on a rear side of the body portion 10a of the side member outer panel 10 in the longitudinal direction of the vehicle body, the wall surface portion 9d on a front side in the longitudinal direction of the vehicle body constituting the body portion 9a of the front pillar outer panel 9, and the wall surface portion 11d on a front side in the longitudinal direction of the vehicle body constituting the main body portion 11a of the front pillar reinforcement 11 overlap with the wall surface portion 10d of the side member outer panel 10 in this order.

That is, in the fixing portion constituted of the first fastening hole 36a or the second fastening hole 36b, ranging from a front side in the longitudinal direction of the vehicle body to a rear side in the longitudinal direction of the vehicle body, the rear wall portion 31a of the gusset rear panel 30, the wall surface portion 10d of the side member outer panel 10, the wall surface portion 9d of the front pillar outer panel 9, and the wall surface portion 11d of the front pillar reinforcement 11 overlap with each other in this order. Bolt insertion holes 10e, 9e, 11e are formed in the respective wall surface portions 10d, 9d, 11d at positions corresponding to the first fastening hole 36a and the second fastening hole 36b formed in the gusset rear panel 30.

In such structure, the bolts 51 penetrate the first fastening holes 36a or the second fastening holes 36b, and the bolt insertion holes 10e, 9e, 11e from a front side of the gusset rear panel 30 in the longitudinal direction of the vehicle body, and fasten and fix the gusset rear panel 30 to the front pillar 5 together with the nuts 52 threadedly engaged with the portions of the bolts 51 penetrating toward a rear side in the longitudinal direction of the vehicle body from the wall surface portion 11d of the front pillar reinforcement 11. In FIG. 2, the fixing portion constituted of the second fastening hole 36b out of the first fastening hole 36a and the second fastening hole 36b is shown.

In the fixing portion constituted of the third fastening hole 36c or the fourth fastening hole 36d, as shown in FIG. 6, the rear wall portion 31a of the gusset rear panel body portion 31 is brought into contact with the front wall portion 7c of the locker outer panel 7 which is a constitutional member of the locker 4 in an overlapping state from a front side in the longitudinal direction of the vehicle body. Further, inside the front wall portion 7c of the locker outer panel 7, that is, on a rear side of the front wall portion 7c of the locker outer panel 7 in the longitudinal direction of the vehicle body, the front wall portion 17c of the locker reinforcement 17 overlaps with the front wall portion 7c of the locker outer panel 7.

That is, in the fixing portion constituted of the third fastening hole 36c or the fourth fastening hole 36d, ranging from a front side in the longitudinal direction of the vehicle body to a rear side in the longitudinal direction of the vehicle body, the rear wall portion 31a of the gusset rear panel 30, the front wall portion 7c of the locker outer panel 7, and the front wall portion 17c of the locker reinforcement 17 overlap with each other in this order. Bolt insertion holes 7d, 17d are formed in the respective front wall portions 7c, 17c at positions corresponding to the third fastening holes 36c or the fourth fastening holes 36d formed in the gusset rear panel 30.

In such structure, the bolts 51 penetrate the third fastening holes 36c or the fourth fastening holes 36d, and the bolt insertion holes 7d, 17d from a front side of the gusset rear panel 30 in the longitudinal direction of the vehicle body, and fasten and fix the gusset rear panel 30 to the locker 4 together with the nuts 52 threadedly engaged with the portions of the bolts 51 penetrating toward a rear side in the longitudinal direction of the vehicle body from the front wall portion 17c of the locker reinforcement 17. In FIG. 6, the fixing portion constituted of the fourth fastening hole 36d out of the third fastening hole 36c and the fourth fastening hole 36d is shown.

In the fixing portion constituted of the fifth fastening hole 36e, as shown in FIG. 6 and FIG. 7, the end wall portion 34d of the lower end extending portion 34 is brought into contact with the wall surface portion 15d on a front side in the longitudinal direction of the vehicle body constituting the torque box body portion 15a of the torque box 15 in an overlapping state from a front side in the longitudinal direction of the vehicle body. Further, inside the wall surface portion 15d of the torque box 15, that is, on a rear side of the wall surface portion 15d of the torque box 15 in the longitudinal direction of the vehicle body, the wall surface portion 18d of the torque box reinforcement 18 on a front side in the longitudinal direction of the vehicle body overlaps with the wall surface portion 15d of the torque box 15.

That is, in the fixing portion constituted of the fifth fastening hole 36e, ranging from a front side in the longitudinal direction of the vehicle body to a rear side in the longitudinal direction of the vehicle body, the end wall portion 34d of the lower end extending portion 34, the wall surface portion 15d of the torque box 15, and the wall surface portion 18d of the torque box reinforcement 18 overlap with each other in this order. Bolt insertion holes 15e, 18e are formed in the respective wall surface portions 15d, 18d at positions corresponding to the fifth fastening holes 36e formed in the gusset rear panel 30.

In such structure, the bolts 51 penetrate the fifth fastening holes 36e and the bolt insertion holes 15e, 18e from a front side of the gusset rear panel 30 in the longitudinal direction of the vehicle body, and fasten and fix the gusset rear panel 30 to the torque box 15 together with the nuts 52 threadedly engaged with the portions of the bolts 51 penetrating toward a rear side in the longitudinal direction of the vehicle body from the wall surface portion 18d of the torque box reinforcement 18.

The fixing structure for fixing the gusset member 20 according to this embodiment to the vehicle body frame structure is constituted as described above. In the gusset rear panel 30 and the gusset front panel 40, besides the fastening holes 36 and the operation holes 46 for bolt fastening of the gusset member 20, reference holes 37, 47 for positioning between the gusset rear panel 30 and the gusset front panel 40 are suitably formed at predetermined positions. The reference holes 37, 47 are holes having the substantially same size as the fastening holes 36.

In this embodiment, for example, as shown in FIG. 4, in the gusset rear panel 30, the reference hole 37 is formed in a lower end portion of the rear wall portion 31a disposed at a position below the third fastening hole 36c and the fourth fastening hole 36d. Further, for example, as shown in FIG. 5, in the gusset front panel 40, the reference holes 47 are formed in two portions at positions disposed between the second operation hole 46b and the third operation hole 46c in the gusset longitudinal direction, that is, the positions close to a lower side of the gusset front panel body portion 41.

On the gusset member 20 which is fixed to the vehicle body frame structure by bolt fastening as described above and is disposed in front of the front pillar 5 in the longitudinal direction of the vehicle body, the stepped portion 21 extending along the vertical direction of the vehicle body (gusset longitudinal direction) is formed by the gusset front panel 40 on a front side in the longitudinal direction of the vehicle body. The stepped portion 21 is formed by the step forming portion 42 on the gusset front panel 40. In the step forming portion 42, the stepped surface 22 is formed by the stepped surface forming portion 42a by making the inner flange portion 42b which is a portion disposed inside in the vehicle width direction relatively in front of the gusset front panel body portion 41 which is a portion disposed outside in the vehicle width direction in the longitudinal direction of the vehicle body.

That is, it is safe to say that the structure where the gusset member 20 is fixed to the vehicle body frame structure is the structure where, as described previously, the gusset front panel 40 which forms the stepped portion 21 is fixed to the vehicle body frame structure by way of the gusset rear panel 30, and the gusset front panel 40 is supported in a reinforced manner by the gusset rear panel 30 from a rear side in the longitudinal direction of the vehicle body. In other words, in the gusset member 20, the stepped portion 21 which constitutes a substantial shaped portion is formed by the gusset front panel 40, and the gusset rear panel 30 which is a portion to be fixed and supported by the vehicle body frame structure is joined to the gusset front panel 40. Accordingly, as a whole, the gusset member 20 is provided as a reinforcing member integrally formed with the vehicle body frame structure.

The gusset member 20 provided in front of the front pillar 5 in the longitudinal direction of the vehicle body covers the vehicle body frame structure within a range from the position of the lower end of the vehicle body frame structure, that is, from the position of the lower end of the front pillar 5 to a height position which reaches an upper portion of the front tire 3, for example, with respect to the vertical direction of the vehicle body. The gusset member 20 covers the vehicle body frame structure ranging from the position of the end portion of the front pillar 5 or the locker 4 on an outer side in the vehicle width direction to the position of the end portion of the dash panel 13 on an outer side in the vehicle width direction, for example, with respect to the vehicle width direction.

In this embodiment, the gusset member 20 is provided in a state where a portion on an inner side in the vehicle width direction of the gusset rear panel 30 having an opening side on a front side in the longitudinal direction of the vehicle body and having an approximately hat-shaped transverse cross-sectional shape conforms to a transverse cross-sectional shape of the joint portion between the dash panel 13 and the side member outer panel 10. To be more specific, in a transverse cross-sectional shape, the gusset member 20 is provided in a state where the inner flange portion 32 of the gusset rear panel 30 conforms to a portion of the dash panel body portion 13a of the dash panel 13 on an outer side in the vehicle width direction, the inner side wall portion 31c conforms to the side flange portion 13b of the dash panel 13, the joint edge portion 8b of the front pillar inner panel 8, and a joint portion of the flange portion 10b of the side member outer panel 10, and the rear wall portion 31a conforms to the wall surface portion 10d. Due to such a constitution, the gusset member 20 is provide in a state where a stepped shape formed by the inner flange portion 32, the inner side wall portion 31c and the rear wall portion 31a on a back surface side conforms with the stepped portion between the dash panel 13 on a vehicle body frame structure side and the front pillar 5 formed on an outer side in the vehicle width direction.

The gusset member 20 is provided such that an inner side of the gusset member 20 in the vehicle width direction extends to a portion of the dash panel body portion 13a of the dash panel 13 on an outer side in the vehicle width direction, and an outer side of the gusset member 20 in the vehicle width direction extends to an area in the vicinity of the end portion of the front pillar 5 or the locker 4 in the vehicle width direction. The gusset member 20 is provided so as to cover the vehicle body frame structure from a front side in the longitudinal direction of the vehicle body within the above-mentioned range.

According to the vehicle front part structure 1 of this embodiment provided with the above-mentioned constitution, it is possible to prevent the front tire 3 which moves backward while going along an inner track when a front portion of a vehicle collides such as at the time of an offset collision or the like from giving an impact to a thin plate portion such as a dash panel 13 without largely changing the basic frame of the vehicle whereby safety can be enhanced. Such manner of operation and advantageous effects are explained specifically.

Figure 9:
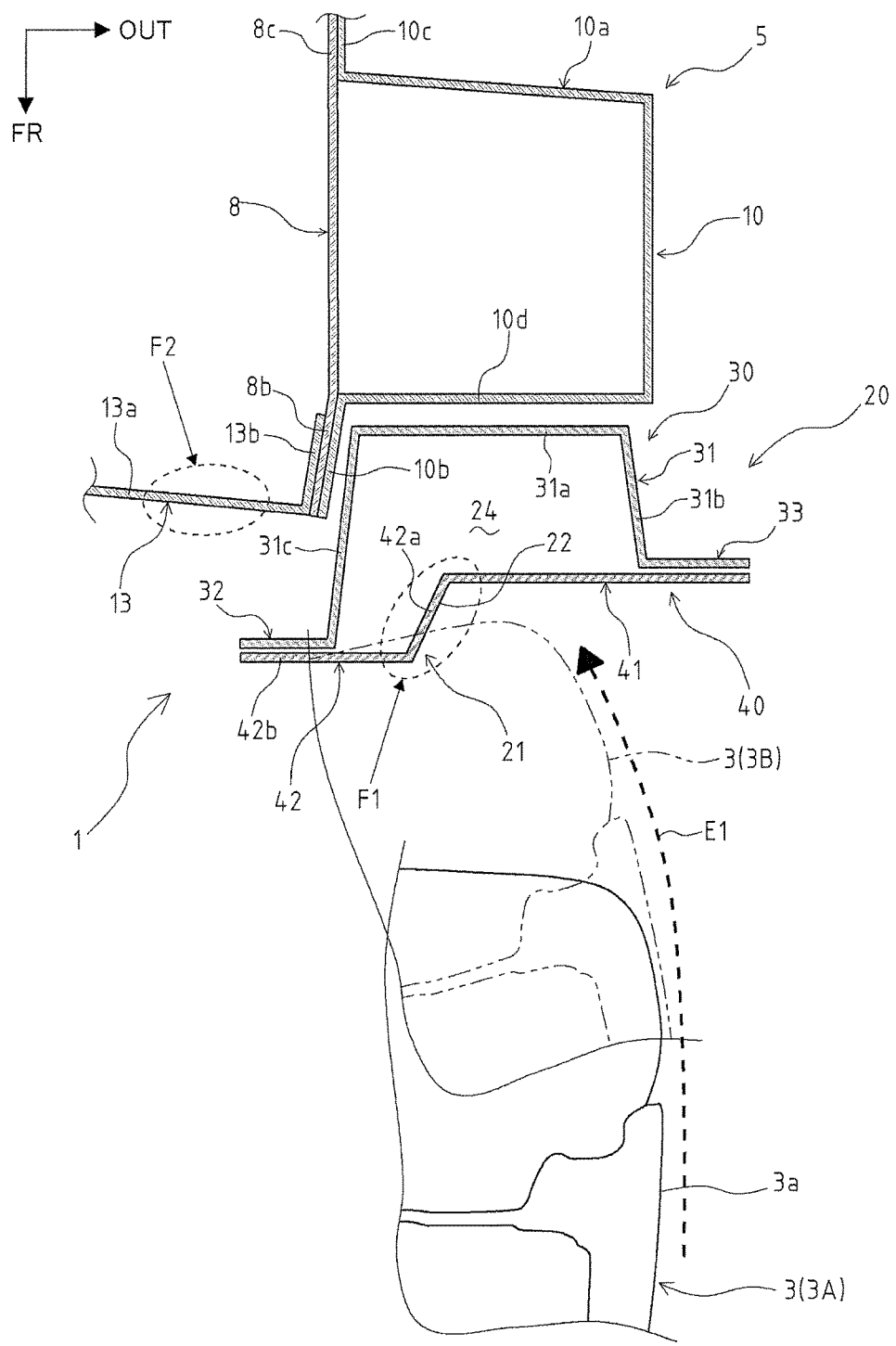
FIG. 9 is an explanatory view relating to the manner of operation and advantageous effects of the vehicle front part structure according to the first embodiment of the present invention.
Figure 10:
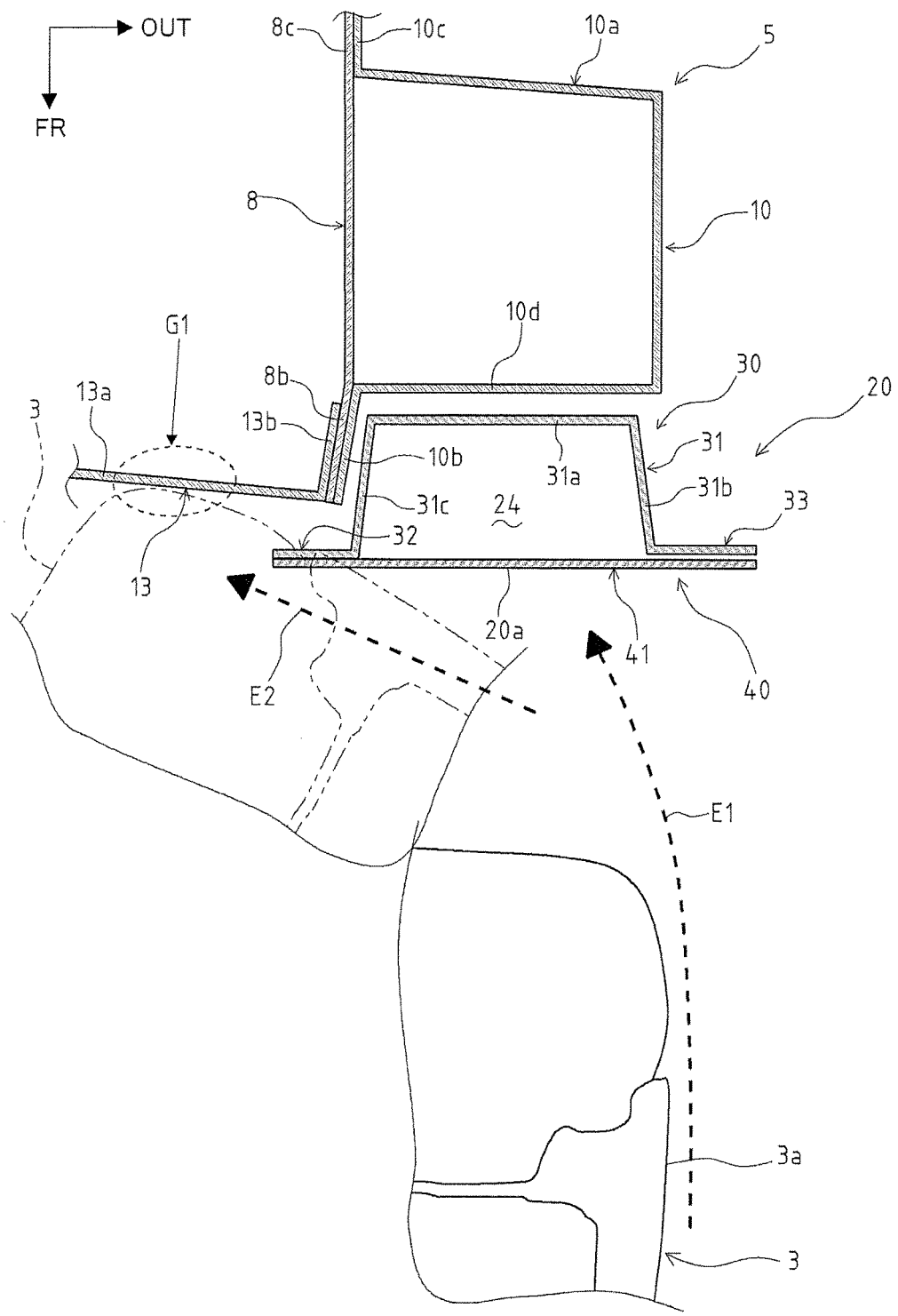
FIG. 10 is a view showing the structure of a comparison example with respect to the vehicle front part structure according to the first embodiment of the present invention.

Firstly, the manner of operation and advantageous effects acquired by the stepped portion 21 which the gusset member 20 possesses are explained by reference to FIG. 9 and FIG. 10. As shown in FIG. 9, when the front portion of the vehicle collides such as at the time of an offset collision involving the vehicle 2, the front tire 3 on a collision side moves backward while being steered toward an inner side of the vehicle 2 (while going along an inner track) (see an arrow E1 indicated by a broken line) as described above. That is, the front tire 3 (3A) which is at an original position in the vehicle 2 moves backward while going along an inner track by an impact when the vehicle collision occurs. On the extension of a trajectory of the front tire 3 moving back while going along an inner track, thin plate portions having a relatively weak strength (constitutional members of the dash panel 13 and the front pillar 5 or the like) are present among the constitutional members of the vehicle body frame structure.

In view of the above, in the vehicle front part structure 1 of this embodiment, the front tire 3 which moves backward while going along an inner track at the time of vehicle corrosion collides with the gusset member 20 (see a portion indicated by symbol F1). With respect to the front tire 3 (3B) which collides with the gusset member 20, the front tire 3 (3B) is caught by the stepped portion 21 which forms the stepped surface 22 directed toward the outside in the vehicle width direction on a front surface side of the gusset member 20 and hence, the rotation of the front tire 3 (3B) along an inner track and the intrusion of the front tire 3 (3B) toward the inside of the vehicle body are prevented. In an actual operation, the front tire 3 receives a catching action of the stepped portion 21 by a rim portion of the wheel 3a having higher rigidity than a tire body. That is, the stepped portion 21 which the gusset member 20 has functions as a catching shaped portion for the front tire 3 which moves backward while going along an inner track at the time of collision involving the vehicle, and particularly a catching portion for the wheel 3a.

In this manner, according to the vehicle front part structure 1 of this embodiment, the movement of the front tire 3 which tends to move back while going along an inner track at the time of collision involving the vehicle can be stopped by making the front tire 3 caught by the stepped portion 21 of the gusset member 20. That is, the front tire 3 is locked by the stepped portion 21 of the gusset member 20 and hence, the further rotation and moving back of the front tire 3 can be restricted. Accordingly, it is possible to suppress the front tire 3 from advancing toward a dash panel 13 side at the time of collision involving the vehicle and hence, it is possible to prevent the front tire 3 from imparting an impact to a thin plate portion such as the dash panel 13 whereby unexpected inputting of the impact to the vehicle 2 can be prevented.

Here, assume the structure where the stepped portion 21 is not formed on a front surface side of the gusset member 20 as the structure of a comparison example for the vehicle front part structure 1 according to this embodiment. The behavior of the front tire 3 when the vehicle having the structure of the comparison example collides is explained by reference to FIG. 10. As shown in FIG. 10, in the structure of the comparison example, the stepped portion 21 is not provided to the gusset member 20 so that the surface 20a of the gusset member 20 which becomes a surface on a front surface side of a gusset front panel 40 is formed into a planar shape.

According to such structure of the comparison example, the front tire 3 (wheel 3a) which moves backward while moving along an inner track at the time of collision involving the vehicle (see an arrow E1 indicated by a broken line) is brought into contact with the gusset member 20 and, thereafter, due to actions consisting of the rotation along an inner track and the backward moving of the front tire 3, the front tire 3 slides on the surface 20a of the gusset member 20 and continues the rotation along an inner track and the backward moving and invades into the inside in the vehicle width direction (see an arrow E2 indicated by a broken line).

The front tire 3 (wheel 3a) which invades into the inside in the vehicle width direction increases a deformation amount of the dash panel 13 (see a portion indicated by symbol G1). That is, in this case, inputting of an impact to the dash panel 13 having a relatively small plate thickness is increased and hence, the deformation of the vehicle body is increased. Further, the front tire 3 (wheel 3a) which invades into the inside in the vehicle width direction is sandwiched between the barrier which the vehicle 2 collides and the vehicle body and hence, inputting of an impact to the vehicle body is increased whereby a deformation amount of the vehicle body is increased. In this case, the front tire 3 (wheel 3a) which invades into the inside in the vehicle width direction, depending on a case, breaks the side member outer panel 10 which is a thin plate portion having a relatively small plate thickness at a joint portion between the dash panel 13 and the front pillar 5 or peels off joining between the respective members at the joint portion.

In this respect, according to the vehicle front part structure 1 of this embodiment, the front tire 3 (wheel 3a) which moves backward while moving along an inner track at the time of collision involving the vehicle is caught by the stepped portion 21 of the gusset member 20. Accordingly, sliding of the front tire 3 toward the inside in the vehicle width direction can be suppressed and hence, the invasion of the front tire 3 into the inside in the vehicle width direction can be restricted whereby the behavior of the front tire 3 can be made stable. That is, according to the vehicle front part structure 1 of this embodiment, it is possible to realize the stabilization and the control of the behavior of the tire when the vehicle collides. Accordingly, it is possible to obviate the increase of a deformation amount of the dash panel 13 brought about by the front tire 3 (see a portion indicated by a symbol F2) and hence, the deformation or the like of the dash panel 13 can be prevented whereby safety can be enhanced.

The invasion of the front tire 3 into the inside in the vehicle width direction can be prevented by the stepped portion 21 of the gusset member 20. Accordingly, it is possible to prevent the front tire 3 (wheel 3a) from being sandwiched between the barrier with which the vehicle 2 collides and the vehicle body and hence, inputting of an impact into the vehicle body and, particularly, inputting of an impact into the dash panel 13 can be decreased whereby a deformation amount of the vehicle body can be decreased. Further, it is possible to prevent the occurrence of a phenomenon that, the side member outer panel 10 which is a thin plate portion having a relatively small plate thickness is broken at a joint portion between the dash panel 13 and the front pillar 5 or joining between the respective members at the joint portion is peeled off due to the front wheel 3 (wheel 3) which intrudes into the inside in the vehicle width direction.

Further, the invasion of the front tire 3 into the inside in the vehicle width direction can be prevented by the stepped portion 21 of the gusset member 20 and hence, a load can be stably transmitted to the locker 4 extending in the longitudinal direction of the vehicle body. That is, the vehicle front part structure 1 of this embodiment includes the gusset member 20, it is possible to stably transmit a load to the locker 4 when an impact is inputted to the vehicle body at the time of collision involving the vehicle.

Further, the vehicle front part structure 1 of this embodiment is configured such that the gusset member 20 which constitutes the separate member is mounted on the vehicle body frame structure of the vehicle 2. That is, the gusset member 20 has the constitution which allows the mounting of the gusset member 20 on the vehicle body frame structure by so-called bolt-on mounting. Due to such a constitution, according to the vehicle front part structure 1 of this embodiment, without changing the vehicle body frame structure and parts around a chassis of the vehicle, that is, without largely changing the basic frame of the vehicle 2, with only the addition of the gusset member 20, the behavior of the front tire 3 at the time of collision involving the vehicle can be controlled so that it is possible to protect the thin plate portion such as the dash panel 13.

That is, the vehicle front part structure 1 of this embodiment adopts the constitution where the gusset member 20 is mounted on the vehicle body frame structure. Accordingly, safety at the time of collision involving the vehicle can be enhanced without increasing a plate thickness of the whole dash panel 13 for enhancing strength or enhancing a joining strength of the dash panel 13 to the locker 4, the front pillar 5 and the like. As a result, it is possible to realize both the enhancement of collision performance against collision involving the vehicle and the reduction of weight of the vehicle body. Further, in the vehicle front part structure 1 of this embodiment, it is unnecessary to exchange parts per se with new parts or to form parts by molding additionally with respect to the vehicle body frame structure and hence, the vehicle front part structure can be easily introduced whereby the vehicle front part structure is advantageous also from a viewpoint of the cost.

Figure 11:
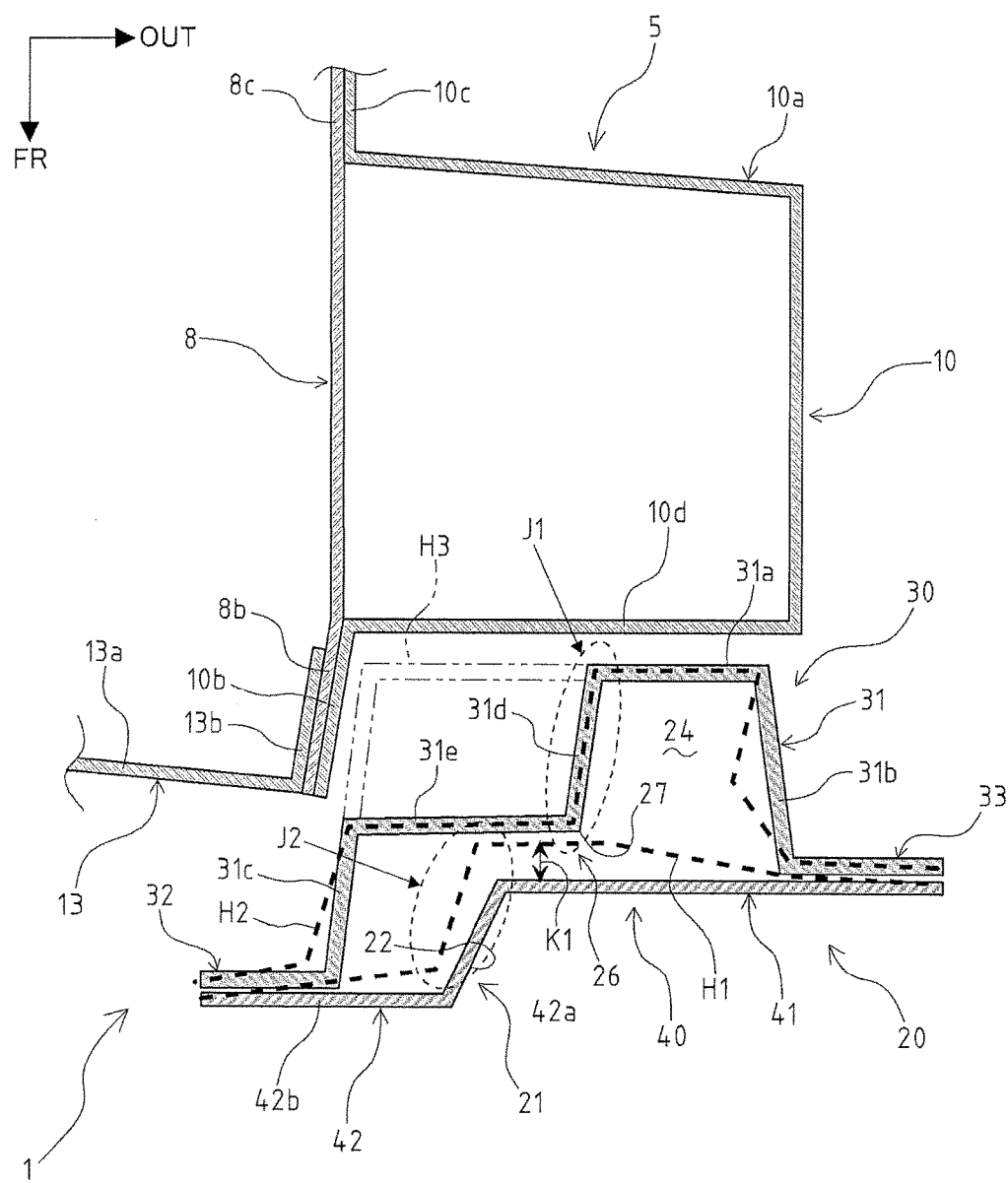
FIG. 11 is an explanatory view relating to the manner of operation and advantageous effects of the vehicle front part structure according to the first embodiment of the present invention.
Figure 12:
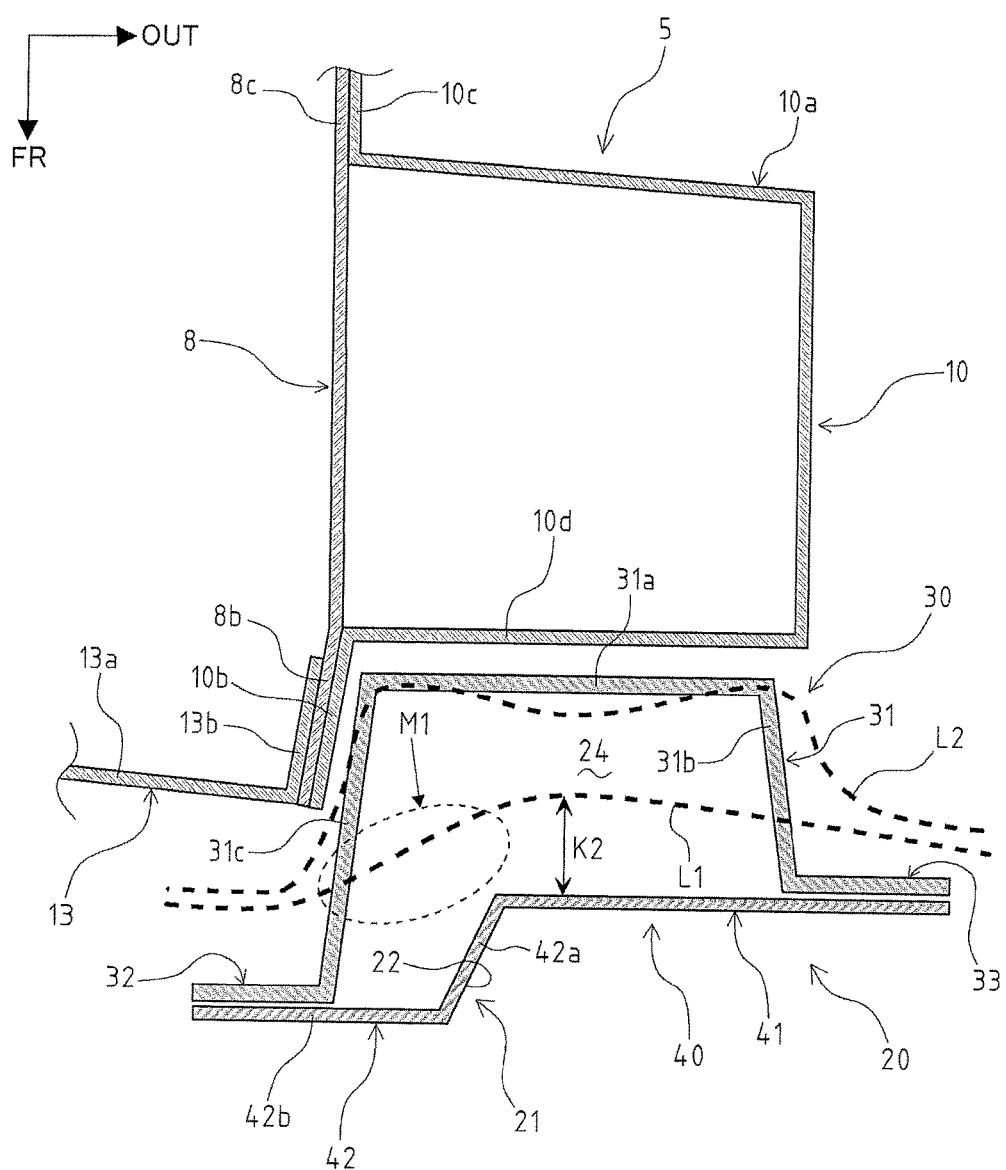
FIG. 12 is a view showing the structure of a comparison example with respect to the vehicle front part structure according to the first embodiment of the present invention.

Next, the manner of operation and advantageous effects brought about by the bulk shaped portion 26 which the gusset member 20 has are explained by reference to FIG. 11 and FIG. 12. As shown in FIG. 11, when the front tire 3 which moves backward while moving along an inner track at the time of the collision involving the vehicle collides with the gusset member 20, due to an impact of the collision, mainly the gusset front panel 40 which is the member on a contact side of the front tire 3, that is, on a front surface side of the front tire 3 is deformed such that a transverse cross-sectional shape of the gusset front panel 40 changes. In this case, the gusset front panel 40 which directly receives imputing of the impact from the front tire 3 is relatively largely deformed such that the gusset front panel 40 is bent by pressing and is crushed toward a rear side in the longitudinal direction of the vehicle body. In FIG. 11, the gusset front panel 40 and the gusset rear panel 30 after deformation are indicated by broken lines H1, H2 respectively.

In the bulk shaped portion 26, at the gusset member 20 formed into a hollow shape, a distance in the longitudinal direction of the vehicle body between the rear wall portion 31a and the inner flange portion 42b is narrowed compared to the portion where the bulk shaped portion 26 in the gusset longitudinal direction is not formed (see a portion H3 indicated by a double dashed chain line in FIG. 11, hereinafter referred to as "general shaped portion" in the gusset rear panel 30). Due to such a constitution, the bulk shaped portion 26 functions as a support for the gusset front panel 40 which is deformed by an impact of the front tire 3 as described previously and hence, a deformation amount of the gusset member 20, particularly a deformation amount of the gusset front panel 40 can be reduced.

That is, the bulk shaped portion 26 projects toward a front side in the longitudinal direction of the vehicle body from the rear wall portion 31a with respect to the general shaped portion and partially narrows the hollow portion of the gusset member 20 in the longitudinal direction of the vehicle body and hence, the bulk shaped portion 26 is brought into contact with the gusset front panel 40 before a deformation amount of the gusset front panel 40 which is deformed toward a rear side in the longitudinal direction of the vehicle body becomes large thus supporting the gusset front panel 40 from a rear side in the longitudinal direction of the vehicle body (see a portion indicated by symbol J1). Due to such a constitution, the deformation of the gusset front panel 40 can be suppressed.

Since a defamation amount of the gusset front panel 40 becomes small, the gusset front panel 40 can also easily maintain the shape of the stepped portion 21 even after the gusset front panel 40 is deformed due to an impact of the front tire 3 (see a portion indicated by symbol J2). That is, due to the formation of the bulk shaped portion 26, even after the gusset front panel 40 is deformed, the bulk shaped portion 26 can maintain a function of a catching shaped portion for catching the front tire (wheel 3a).

Here, assume the structure where the bulk shaped portion 26 is not provided to the gusset member 20 as the structure of a comparison example for the vehicle front part structure 1 according to this embodiment. The deformation of the gusset front panel 40 at the time of the collision involving the vehicle in the structure of the comparison example is explained by reference to FIG. 12. As shown in FIG. 12, when the bulk shaped portion 26 is not provided to the gusset member 20, the whole gusset rear panel 30 in the gusset longitudinal direction is formed of the general shaped portion (see a portion H3 in FIG. 11).

FIG. 12.

In the above-mentioned structure of the comparison example, when the gusset member 20 is deformed due to an impact of the front tire 3 at the time of the collision involving the vehicle, the gusset front panel 40 which is a member on a contact side is not supported by the bulk shaped portion 26 from a rear side and hence, a deformation amount of the gusset front panel 40 becomes large (see an arrow K2). In FIG. 12, the gusset front panel 40 and a gusset rear panel 30 after deformation are indicated by broken lines L1, L2 respectively.

When the gusset front panel 40 is largely deformed, a transverse cross-sectional shape of the gusset member 20 having a hollow shape is crushed also coupled with the deformation of the gusset rear panel 30. Accordingly, in the gusset front panel 40, a bent shaped portion which forms the stepped portion 21 is extended so that a stepped shape formed by the stepped portion 21 becomes smaller (gentler) (see a portion indicated by a symbol M1). In this manner, in the constitution which is not provided with the bulk shaped portion 26, a deformation amount of the gusset front panel 40 becomes large and hence, the shape of the stepped portion 21 be minimally maintained whereby it becomes difficult to effectively make use of an action of suppressing the behavior of the front tire 3 along an inner track acquired by the stepped portion 21.

In this respect, by adopting the constitution where the gusset member 20 includes the bulk shaped portions 26 as in the case of this embodiment, the gusset front panel 40 which is liable to be largely deformed can be supported from a rear side in the longitudinal direction of the vehicle body by the bulk shaped portions 26. Accordingly, it is possible to suppress the deformation of the gusset member 20, particularly, the deformation of the gusset front panel 40 which is the member on a contact side caused by the collision involving the front tire 3 which moves backward while moving along an inner track at the time of collision involving the vehicle and hence, a defamation amount of the deformation of the gusset member 20 in cross section can be made small (see the arrow K1 shown in FIG. 11 in comparison with the arrow K2 shown in FIG. 12). Accordingly, the gusset front panel 40 can maintain the shape of the stepped portion 21 also after the gusset front panel 40 is deformed (see the portion indicated by symbol J2) and hence, it is possible to effectively make use of an action of suppressing the inner track behavior of the front tire 3 acquired by the stepped portion 21.

The constitution of the bulk shaped portion 26 formed in the hollow inside of the gusset member 20 is not particularly limited provided that the bulk shaped portion 26 is the shaped portion where the ridge 27 extending in the vertical direction of the vehicle body is formed, and the distance between wall portions extending in the longitudinal direction of the vehicle body and forming the hollow portion is partially narrowed.

In this embodiment, the bulk shaped portion 26 is formed on the gusset rear panel 30 at the position close to the inner side wall portion 31c in the gusset width direction. However, the bulk shaped portion 26 may be formed in the mode where the bulk shaped portion 26 is attached to the rear wall portion 31a and the outer side wall portion 31b at the position close to the outer side wall portion 31b. In this embodiment, the bulk shaped portion 26 is provided at two portions vertically spaced apart from each other. However, the bulk shaped portion 26 may be provided at one portion or three or more portions. The bulk shaped portions 26 may be also provided parallel to each other in the gusset width direction. The bulk shaped portion 26 may be also formed over the whole length of the gusset member instead of partially forming the bulk shaped portion 26 in the gusset longitudinal direction.

In this embodiment, the bulk shaped portion 26 includes in addition to the outer bulk surface portion 31d and the front bulk surface portion 31e which form the ridge 27, the lower bulk surface portion 31f and/or the upper bulk surface portion 31g. However, it is sufficient that the bulk shaped portion 26 is configured to have at least portions which form the ridge. On the other hand, from a viewpoint of securing a strength of the bulk shaped portion 26, it is preferable to constitute the bulk shaped portion 26 such that the bulk shaped portion 26 has at least either one of the lower bulk surface portion 31f and the upper bulk surface portion 31g. Also the direction of the ridge which the bulk shaped portion 26 forms is not limited to the direction along the vertical direction of the vehicle body as in the case of this embodiment, and may be the vehicle width direction, the inclination direction inclined toward a predetermined direction or the like.

In this embodiment, the bulk shaped portion 26 is formed on the gusset member 20 on a gusset rear panel 30 side. However, the bulk shaped portion 26 may be formed on the gusset member 20 on a gusset front panel 40 side.

The bulk shaped portion 26 may be constituted of a member separate from the gusset rear panel 30 and the gusset front panel 40. In this case, the bulk shaped portion is constituted such that, in the hollow inside of the gusset member 20, the member which is separate from the gusset rear panel 30 and the gusset front panel 40 is fixed to at least either one of both panels. However, by adopting the constitution where the bulk shaped portion 26 is formed as a part of the gusset rear panel 30 as in the case of this embodiment, the bulk shaped portion 26 can be easily formed without adding an additional part, and the above-mentioned manner of operation and advantageous effects can be acquired.

In the gusset rear panel 30 which is formed using an integral steel plate having a predetermined plate thickness, the bulk shaped portion 26 is formed as a part of the steel plate. Accordingly, the bulk shaped portion 26 can be easily formed by drawing or the like, for example. Further, by forming the bulk shaped portion 26 as a part of the gusset rear panel 30, a strength of the gusset rear panel 30, eventually, a strength of the gusset member 20 can be enhanced. Accordingly, it is unnecessary to excessively increase a plate thickness of the gusset rear panel 30 and a plate thickens of the gusset front panel 40 to secure a strength of the gusset member 20 and hence, a mass of the gusset member 20 can be reduced.

Second Embodiment

The second embodiment of the present invention is explained by reference to FIG. 13 to FIG. 16. The explanation of parts which are substantially similar to the corresponding parts of the first embodiment is omitted when appropriate using the common or same symbols or the like. FIG. 14 is a horizontal cross-sectional view showing the front part structure of the vehicle 2 in the same manner as FIG. 2. FIG. 14 corresponds to a cross-sectional view taken along at a position D-D in FIG. 13 (corresponding to a position D'-D' in FIG. 15).

Figure 13:
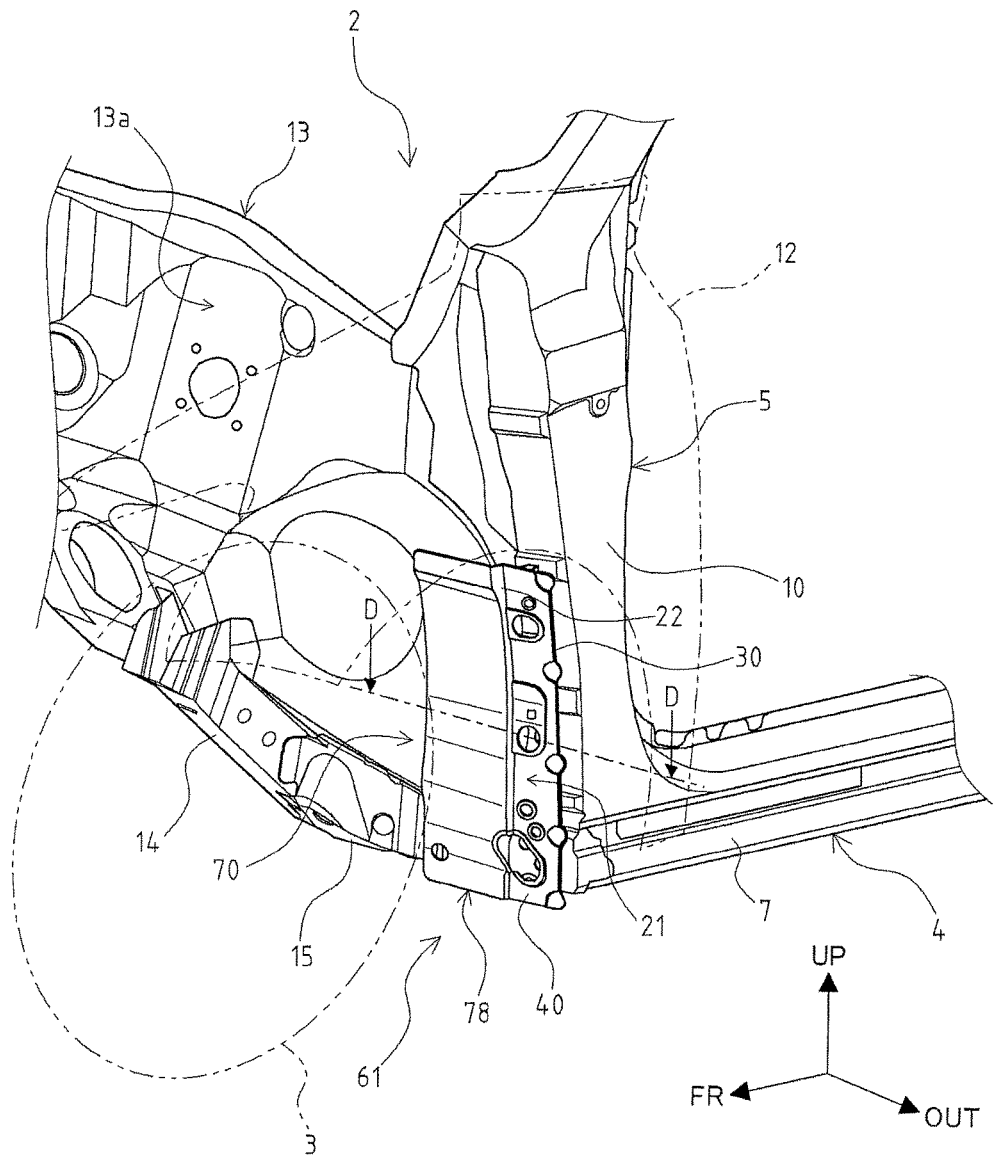
FIG. 13 is a perspective view showing the vehicle front part structure according to a second embodiment of the present invention.
Figure 14:
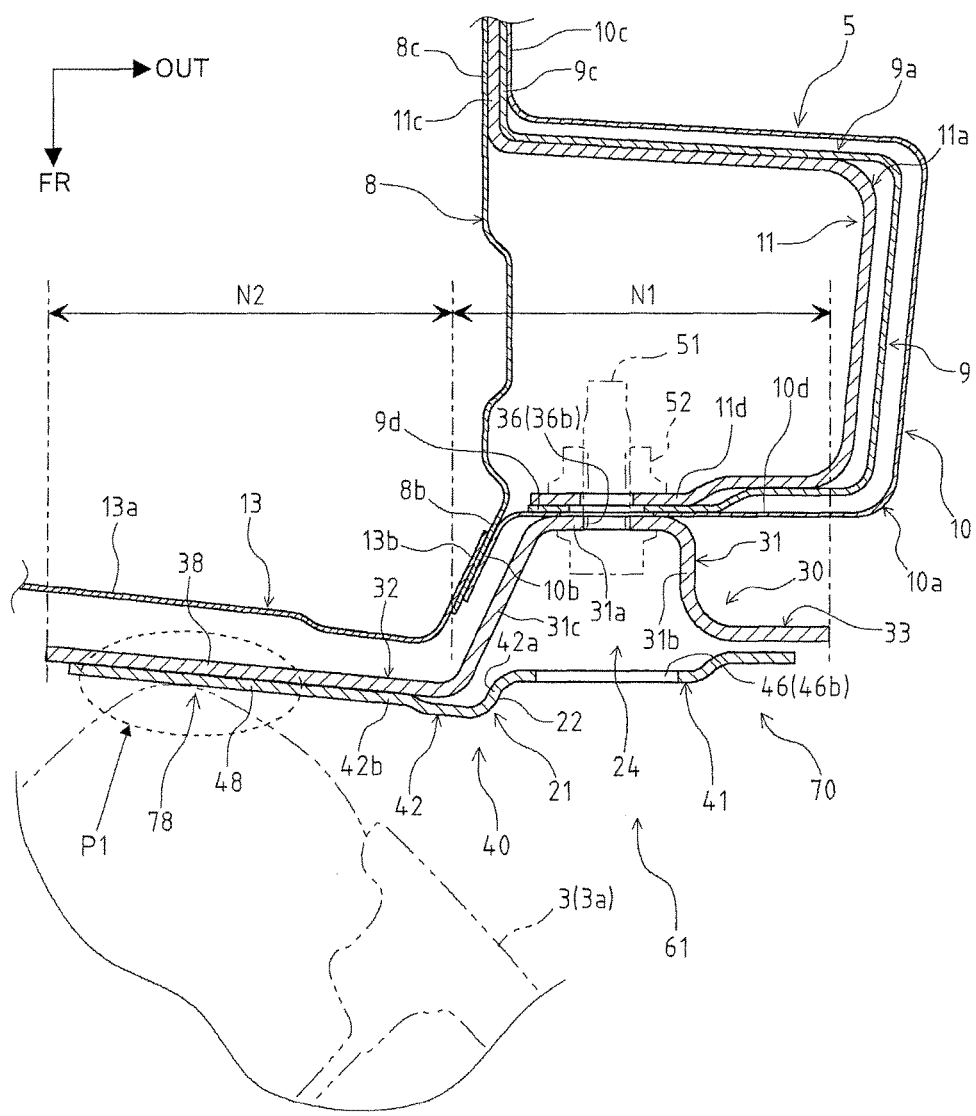
FIG. 14 is a cross-sectional plan view showing the vehicle front part structure according to the second embodiment of the present invention.
Figure 15:
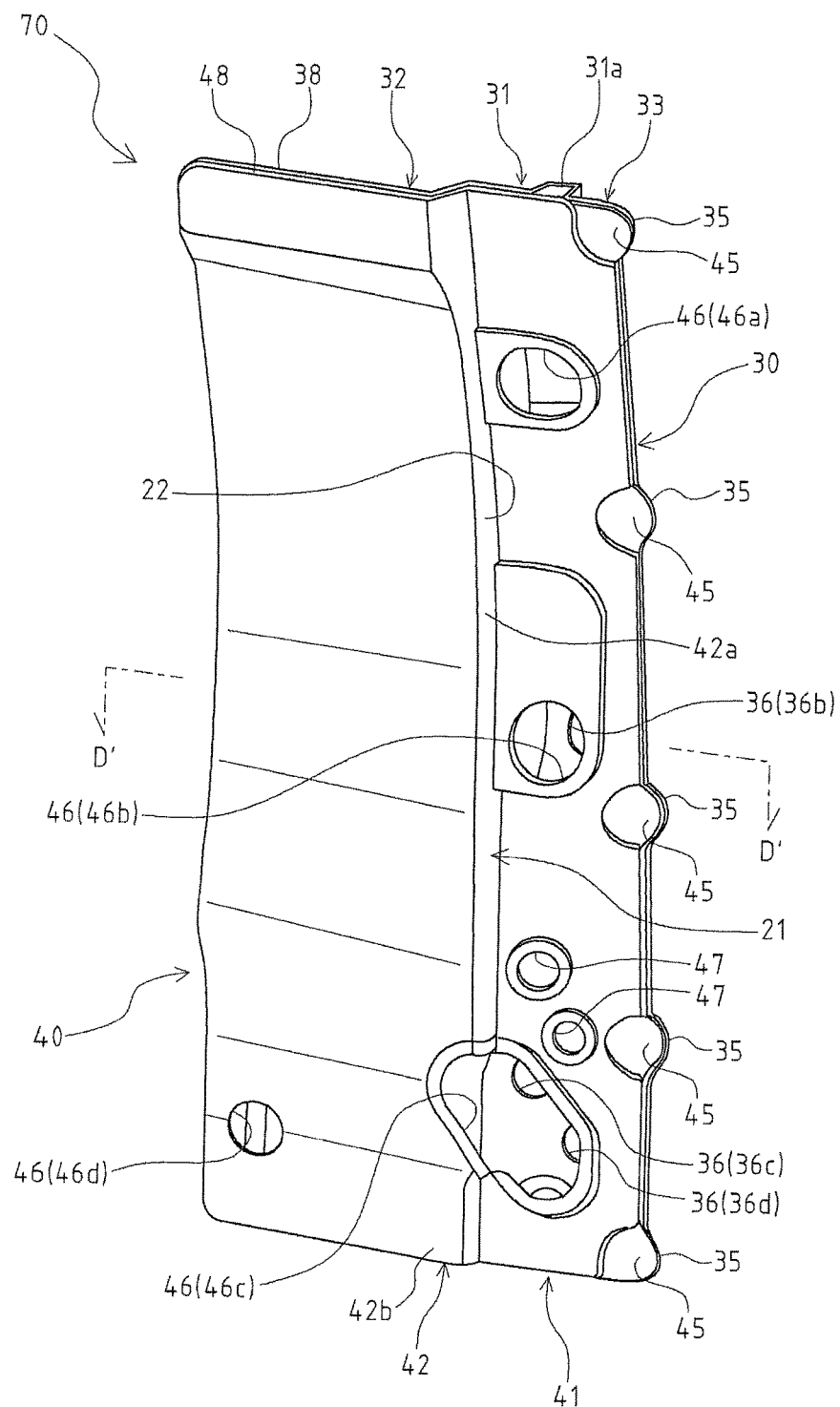
FIG. 15 is a perspective view showing a gusset member according to the second embodiment of the present invention.
Figure 16:
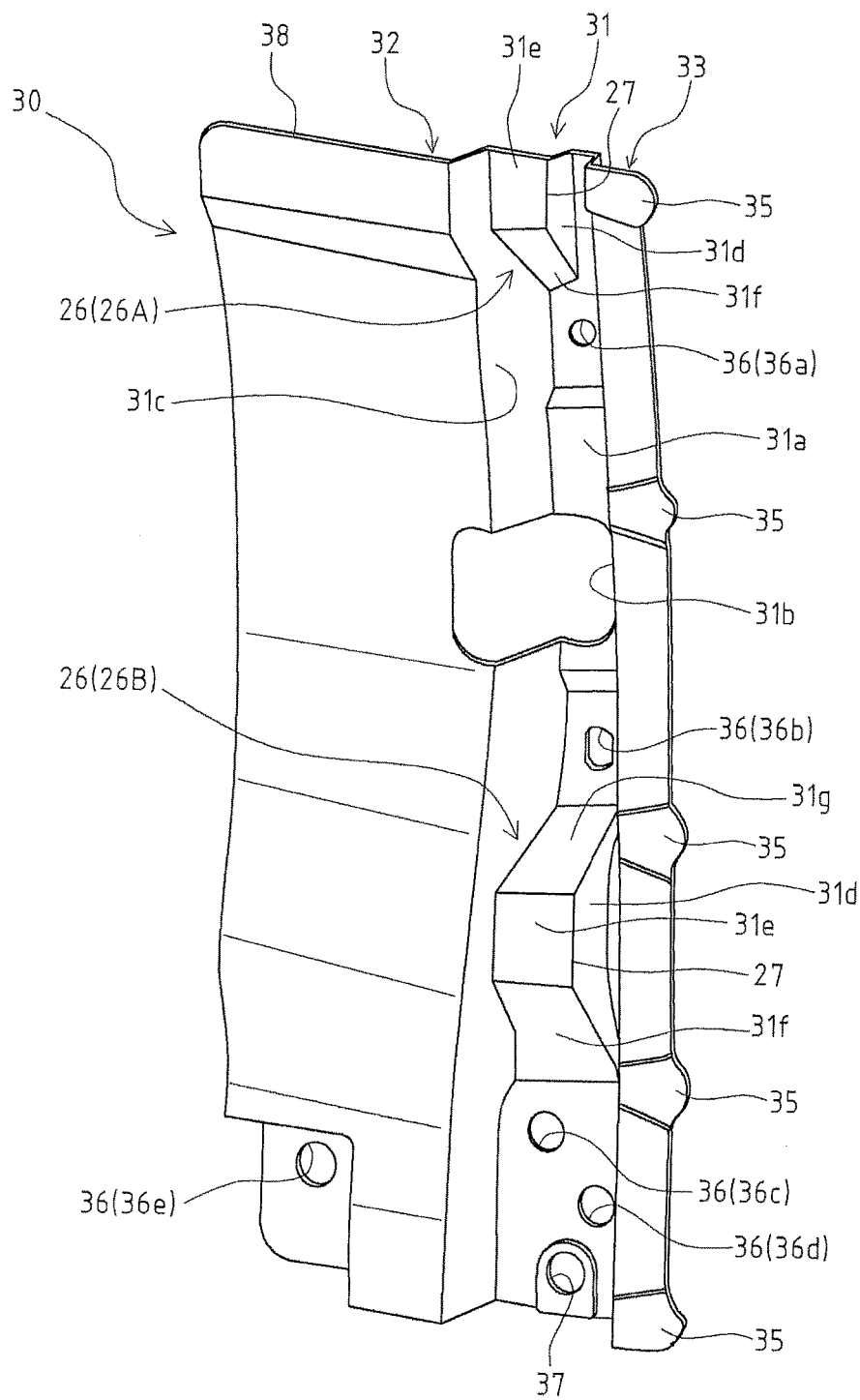
FIG. 16 is a perspective view showing a rear member which is one of constitutional members of the gusset member according to the second embodiment of the present invention.

As shown in FIG. 13 and FIG. 15, a gusset member 70 which the vehicle front part structure 61 according to this embodiment includes differs from the gusset member 20 of the first embodiment with respect to a point that the gusset member 70 includes an extension part 78 which expends toward an inner side in the vehicle width direction from a step forming portion 42 which forms a stepped portion 21 on a gusset front panel body portion 41. The extension portion 78 is a portion which extends toward a more inner side in the vehicle width direction than the stepped portion 21, is positioned in front of a torque box 15 in the longitudinal direction of the vehicle body, and covers at least a portion of the torque box 15 from a front side in the longitudinal direction of the vehicle body, wherein the torque box 15 is a thin plate portion positioned in front of a cabin of a vehicle 2 in the longitudinal direction of the vehicle body.

As shown in FIG. 13, FIG. 14 and FIG. 15, the extension portion 78 is constituted of: a rear extension portion 38 which is an extension portion toward an inner side in the vehicle width direction from an inner flange portion 32 of a gusset rear panel 30; and a front extension portion 48 which is an extension portion toward an inner side in the vehicle width direction from an inner flange portion 42b of a gusset front panel 40. That is, the extension portion 78 is a portion where the both of the inner flange portion 32 and the inner flange portion 42b which overlap with each other in the longitudinal direction of the vehicle body extend toward an inner side in the vehicle width direction while being maintained in a mutually overlapping state. The extension portion 78 is constituted of a duplicate plate-like portion consisting of the rear extension portion 38 and the front extension portion 48.

The rear extension portion 38 and the front extension portion 48 have the substantially equal outer profiles, and overlap with each other in a state where the outer profiles are approximately aligned with each other. In this embodiment, the rear extension portion 38 and the front extension portion 48 are formed of shaped portions respectively formed by directly extending the inner flange portion 32 and the inner flange portion 42b formed on the gusset rear panel 30 and the gusset front panel 40 respectively over the whole length in the gusset longitudinal direction. Accordingly, the rear extension portion 38 and the front extension portion 48 are provided as approximately vertically elongated rectangular portions which are formed on the gusset rear panel 30 and the gusset front panel 40 respectively over the whole length in the gusset longitudinal direction, and have sizes thereof in the gusset longitudinal direction set equal to the size of the whole gusset member 70 as viewed in the front elevation view. However, the extension portion 78 may be constituted of only either one of the rear extension portion 38 and the front extension portion 48. That is, it is sufficient that the extension portion 78 is a portion constituted of at least either one member of the gusset rear panel 30 and the gusset front panel 40.

As shown in FIG. 14, in this embodiment, in the extension portion 78, assuming a size from a position of an end portion of the gusset member 70 on an outer side in the vehicle width direction to a position of a boundary portion (bent portion) between the gusset rear panel body portion 31 of the gusset rear panel 30 and the inner flange portion 32 in the vehicle width direction as a size N1, a size N2 of the extension portion 78 in the extending direction is set approximately equal to the size N1. That is, the extension portion 78 is formed on an inner side of the gusset member 70 in the vehicle width direction such that the extension portion 78 occupies a range of approximately half of the whole guest member 70 in the gusset width direction.

With respect to the extending length of the extension portion 78, in view of the relationship between the extension portion 78 and the vehicle body frame structure, the extension portion 78 is formed so as to cover a portion of the dash panel 13 on an outer side in the vehicle width direction from a front side in the longitudinal direction of the vehicle body. That is, the extension portion 78 extends toward an inner side in the vehicle width direction to a position where the extension portion 78 overlaps with at least a portion of a dash panel 13 as viewed in a front elevation view. Accordingly, in the gusset member 70, a joint portion between the dash panel 13 and the front pillar 5 is covered from a front side in the longitudinal direction of the vehicle body by a portion such as an inner side wall portion 31c or a stepped surface forming portion 42a and, at the same time, a portion of the dash panel body portion 13a on an outer side in the vehicle width direction which is positioned on an inner side in the vehicle width direction with respect to a side flange portion 13b included in the joint portion is covered from a front side in the longitudinal direction of the vehicle body by the extension portion 78.

Further, with respect to the extending length of the extension portion 78, in view of the relationship between the extension portion 78 and the vehicle body frame structure, the extension portion 78 is formed so as to extend to the position where the extension portion 78 interferes with a trajectory of a front tire 3 (wheel 3a) which moves backward while moving along an inner track at the time of collision involving the vehicle. That is, the extension portion 78 is formed so as to cover a portion of a dash panel 13 from a front side in the longitudinal direction of the vehicle body within a range which includes a portion of the dash panel 13 to which the front tire 3 (wheel 3a) gives an impact when the gusset member 20 is not provided.

In the gusset member 70 of this embodiment, the rear extension portion 38 of the gusset rear panel 30 which constitutes the extension portion 78 is formed within a range which includes a lower end extension portion 34 which the gusset member 20 according to the first embodiment has in the gusset rear panel 30. Accordingly, the gusset front panel 40 according to this embodiment includes, in addition to three operation holes 46 which the gusset front panel 40 according to the first embodiment includes, a fourth operation hole 46d at a position corresponding to a fastening hole 36 (36e) formed in the front extension portion 48 (see FIG. 15).

With respect to the mutual welding structure between the gusset rear panel 30 and the gusset front panel 40, in the gusset member 70 of this embodiment, in addition to or in place of the weld portions formed by spot welding provided to portions of the inner flange portion 32 and the inner flange portion 42b which overlap with each other in the gusset member 20 of the first embodiment, weld portions are provided to the extension portion 78 when desired. When the weld portions are provided to the extension portion 78, for example, at an edge portion of the extension portion 78 on an inner side in the vehicle width direction, a plurality of a weld portions are formed at desired intervals in the gusset longitudinal direction in the same manner as a joint portion between the inner flange portion 32 and the inner flange portion 42b.

According to the vehicle front part structure 61 according to this embodiment, the following manner of operation and the advantageous effects can be acquired in addition to the manner of operation and the advantageous effects acquired by the vehicle front part structure 1 according to the first embodiment.

As shown in FIG. 14, according to the vehicle front part structure 61 of this embodiment, the gusset member 70 includes the extension portion 78. Accordingly, even when the front tire 3 which moves backward while moving along an inner track gets over the stepped portion 21 and invades into the inside of the vehicle 2 due to the behavior of the front tire 3 or the like at the time of collision involving the vehicle 2, the front tire 3 (wheel 3a) collides with the extension portion 78 (see portion indicated by symbol P1).

In this manner, according to the vehicle front part structure 61 of this embodiment, the extension portion 78 is provided in front of the dash panel 13 in the longitudinal direction of the vehicle body and hence, regardless of the behavior of the front tire 3 at the time of collision involving the vehicle or the like, the increase of a deformation amount of the dash panel 13 by the front tire 3 (wheel 3a) can be surely prevented thus preventing inputting of an unexpectedly large impact to the vehicle 2. Accordingly, the deformation of the dash panel 13 by an impact given by the front tire 3 or the like can be prevented thus enhancing safety.

Further, according to the vehicle front part structure 61 of this embodiment, the gusset member 70 is enlarged when necessary to a portion to be reinforced (portion to be protected) of the dash panel 13 corresponding to the behavior or the like of the front tire 3 (wheel 3a) at the time of collision involving the vehicle by the extension portion 78. Accordingly, it is possible to prevent the front tire 3 (wheel 3a) from giving an impact to the dash panel 13. In this manner, according to the vehicle front part structure 61 of this embodiment, only a portion of the thin plate portion such as the dash panel 13 which requires reinforcement can be reinforced by the extension portion 78. Accordingly, it is unnecessary to increase a plate thickness of the whole dash panel 13, for example, for reinforcing the dash panel 13 and hence, the dash panel 13 can be efficiently reinforced while minimizing the increase of a mass of the dash panel 13.

That is, according to the vehicle front part structure 61 of this embodiment, the gusset member 70 includes the extension portion 78 which is enlarged to an extent necessary for the reinforcing structure of the vehicle body frame structure. Accordingly, only a portion which requires reinforcement can be reinforced and protected by the gusset member 70 and hence, it is possible to realize both the enhancement of performance against the collision involving the vehicle and the reduction of weight of the vehicle without requiring the increase of the plate thickness of the whole dash panel 13.

In this embodiment, the extension portion 78 is formed as portions of steel plates which respectively constitute the gusset rear panel 30 and the gusset front panel 40. However, the extension portion 78 may be formed of members separate from the gusset rear panel 30 and the gusset front panel 40. However, by adopting the constitution as in the case of this embodiment where the extension portion 78 is formed of portions of the gusset rear panel 30 and the gusset front panel 40, the extension portion 78 can be easily formed without adding additional parts, and the manner of operation and advantageous effects described above can be acquired. In this embodiment, the extension portion 78 is provided as the extension portion extending over the whole gusset member 70 in the gusset longitudinal direction. However, the present invention is not limited to such a constitution, and the extension portion 78 may be provided as the extension portion extending over the portion of the gusset member 70 in the gusset longitudinal direction corresponding to a portion to be reinforced or the like.

As has been described heretofore, according to the vehicle front part structure explained using the embodiments, it is possible to realize both of the control of the behavior of a tire (wheel) when a front portion of the vehicle collides and the reinforcement of the frame of the vehicle body. In the above-mentioned respective embodiments, only the gusset member provided on a left side of the vehicle body is shown in the drawings. However, the vehicle 2 may be configured to include the gusset member on a right side of the vehicle body or may be configured to include a pair of left and right gusset members which is arranged symmetrically in the vehicle width direction. That is, it is sufficient that the gusset member is provided on a front side in the longitudinal direction of the vehicle body of at least one front pillar 5 out of the front pillars 5 on both sides in the vehicle width direction (both left and right sides), that is, at least one side out of the left and right sides of the vehicle body. When the gusset member is provided to only one side out of the left and right sides of the vehicle body, for example, the gusset member is arranged on the side where a driver's seat is arranged corresponding to the arrangement of the driver's seat of the vehicle 2.

The vehicle front part structure according to the present invention explained in the respective embodiments is not limited to the above-mentioned embodiments and various modes can be adopted within the gist of the present invention. For example, in the above-mentioned embodiment, the gusset member 20 is fixed to the vehicle body frame structure extending over three members consisting of the locker 4, the front pillar 5 and the torque box 15 at five fixing portions in total by bolt fastening. However, the fixing structure for fixing the gusset member 20 to the vehicle body frame structure is not particularly limited. That is, it is sufficient that the gusset member 20 is fixed to one or a plurality of members which constitute the vehicle body frame structure, that is, to any portion of the vehicle body frame structure. However, by fixing the gusset member 20 to the vehicle body frame structure extending over a plurality of members such as three members consisting of the locker 4, the front pillar 5 and the torque box 15 as in the case of the above-mentioned embodiment, for example, the connecting structure between three members can be reinforced by the gusset member 20 and hence, an action of reinforcing the vehicle body frame structure by the gusset member 20 can be effectively acquired. Further, the gusset member 20 may be fixed to the vehicle body frame structure by welding or the like besides bolt fastening.

Further, in the above-mentioned embodiment, the gusset member 20 may be formed of an iron-made member. However, a material for forming the gusset member 20 is not particularly limited to an iron steel material, and may be other metal materials, a resin material or the like provided that the gusset member 20 can acquire a desired strength.

In the above-mentioned embodiment, the gusset member 20 is formed by overlapping two panel members consisting of the gusset rear panel 30 and the gusset front panel 40. However, the gusset member 20 may be formed of an integral member such as one panel member or the like, for example. However, from a viewpoint of easiness of working for forming a predetermined shaped portion such as the stepped portion 21 of the gusset member 20, the reduction of weight of the gusset member 20 and the securing of a strength of the gusset member 20, it is preferable to adopt, as the constitution of the gusset member 20, the hollow constitution constituted of the gusset rear panel 30 and the gusset front panel 40 as in the case of the above-mentioned embodiment.

That is, for example, when the gusset member 20 is formed of an integral panel member, a plate thickness of the gusset member 20 is increased so as to acquire a predetermined strength and hence, working for forming a predetermined shaped portion such as the stepped portion 21 becomes difficult and a weight of the gusset member 20 is also increased. In this respect, by forming the gusset member 20 in a hollow shape by overlapping two panel members to each other, plate thicknesses of the respective panel members can be reduced and hence, the working for forming the predetermined shaped portion can be facilitated and the structure which is light-weighted and is minimally deformed can be efficiently realized.

With respect to the shape of the gusset member 20, in the above-mentioned shape, the gusset member 20 is formed so as to have an approximately vertically elongated rectangular shape as viewed in a front elevation view. However, the whole shape of the gusset member 20 is not particularly limited. Accordingly, the gusset member 20 may be a member which has an approximately oblong circular outer profile as viewed in a front elevation view or a member which has an approximately laterally elongated outer profile where the vehicle width direction is set in the longitudinal direction.

Further, in the above-mentioned embodiment, the stepped surface 22 formed by the stepped portion 21 which the gusset member 20 includes is formed of the surface which is directed obliquely and frontwardly on an outer side in the vehicle width direction. However, it is sufficient that the stepped surface 22 is a surface which substantially faces the outside in the vehicle width direction. Accordingly, the stepped surface 22 may be a surface along the longitudinal direction of the vehicle body such as the direction orthogonal to the vehicle width direction as viewed in a plan view or a surface which is directed obliquely and rearwardly on an outer side in the vehicle width direction.

What is claimed is:

1. A vehicle front part structure comprising:
    a locker arranged on both outer sides of a lower portion of a vehicle body of a vehicle in a vehicle width direction, a longitudinal direction of the vehicle body being a longitudinal direction of the locker;
    a front pillar formed on an end portion of the locker on a front side of the vehicle body and extending toward an upper side of the vehicle body from the end portion of the locker;
    a front tire disposed in front of the locker in the longitudinal direction of the vehicle body; and
    a gusset member disposed in front of the front pillar in the longitudinal direction of the vehicle body, the gusset member being fixed to a frame structure of the vehicle body that includes the locker and the front pillar, the gusset member being positioned so as to overlap with at least the front tire in the vertical direction of the vehicle body, the gusset member covering at least a portion of a lower portion of the front pillar on the front side in the longitudinal direction of the vehicle body, wherein:
        the gusset member includes a gusset rear panel and a gusset front panel such that a space is provided between the gusset rear panel and the gusset front panel, and
        the gusset front panel has a stepped portion on a front side thereof in the longitudinal direction of the vehicle body, the stepped portion extending in the vertical direction of the vehicle body such that an inner flange portion of the gusset front panel is disposed in front of a front panel body portion of the gusset front panel in the longitudinal direction of the vehicle body.

2. The vehicle front part structure according to claim 1, wherein the gusset member further comprises an extension portion that is disposed in front of the front panel body portion in the longitudinal direction of the vehicle body, the extension portion being disposed in front of a thin wall portion in the longitudinal direction of the vehicle body, the thin wall portion being disposed in front of a cabin of the vehicle in the longitudinal direction of the vehicle body, and the extension portion covering at least a portion of the thin plate portion from a front side in the longitudinal direction of the vehicle body.

3. The vehicle front part structure according to claim 1, wherein:
    the gusset member is formed of a hollow body having either (i) an approximately closed cross-sectional shape by a wall surface structure or (ii) a closed cross-sectional shape by the wall surface structure,
        the wall surface structure having a longitudinal direction in the longitudinal direction of the vehicle body,
        the wall surface structure including a wall portion on the gusset rear panel in the longitudinal direction of the vehicle body and a wall portion on the gusset front panel in the longitudinal direction of the vehicle body, and
        the wall surface structure forming a transverse cross-sectional shape; and
    the gusset member further comprises a bulk shaped portion formed inside of the hollow body, the bulk shaped portion having a ridge that partially narrows a distance in the longitudinal direction of the vehicle body between the wall portion of the gusset member on the gusset rear panel in the longitudinal direction of the vehicle body and the wall portion of the gusset member on the gusset front panel in the longitudinal direction of the vehicle body.

4. The vehicle front part structure according to claim 2, wherein:
    the gusset member is formed of a hollow body having either (i) an approximately closed cross-sectional shape by a wall surface structure or (ii) a closed cross-sectional shape by the wall surface structure,
        the wall surface structure having a longitudinal direction in the longitudinal direction of the vehicle body,
        the wall surface structure including a wall portion on the gusset rear panel in the longitudinal direction of the vehicle body and a wall portion on the gusset front panel in the longitudinal direction of the vehicle body, and
        the wall surface structure forming a transverse cross-sectional shape; and
    the gusset member further comprises a bulk shaped portion formed inside of the hollow body, the bulk shaped portion having a ridge that partially narrows a distance in the longitudinal direction of the vehicle body between the wall portion of the gusset member on the gusset rear panel in the longitudinal direction of the vehicle body and the wall portion of the gusset member on the gusset front panel in the longitudinal direction of the vehicle body.

* * * * *